US009678943B2

United States Patent
Bi et al.

(10) Patent No.: US 9,678,943 B2
(45) Date of Patent: Jun. 13, 2017

(54) PARTIAL GESTURE TEXT ENTRY

(71) Applicant: Google Inc., Mountain View, CA (US)

(72) Inventors: Xiaojun Bi, Sunnyvale, CA (US); Yu Ouyang, San Jose, CA (US); Shumin Zhai, Los Altos, CA (US)

(73) Assignee: Google Inc., Mountain View, CA (US)

(*) Notice: Subject to any disclaimer, the term of this patent is extended or adjusted under 35 U.S.C. 154(b) by 72 days.

(21) Appl. No.: 14/494,798

(22) Filed: Sep. 24, 2014

(65) Prior Publication Data

US 2015/0012873 A1 Jan. 8, 2015

Related U.S. Application Data

(63) Continuation of application No. 13/793,825, filed on Mar. 11, 2013, now Pat. No. 8,850,350.

(Continued)

(51) Int. Cl.
*G06F 3/048* (2013.01)
*G06F 17/27* (2006.01)
(Continued)

(52) U.S. Cl.
CPC ............ *G06F 17/276* (2013.01); *G06F 3/017* (2013.01); *G06F 3/0237* (2013.01);
(Continued)

(58) Field of Classification Search
CPC .. G06F 3/0484; G06F 3/0237; G06F 3/04883; G06F 3/017; G06F 3/0412; G06F 3/04886
See application file for complete search history.

(56) References Cited

U.S. PATENT DOCUMENTS 4,534,261 A    8/1985   Fabrizio
4,833,610 A    5/1989   Zamora et al.
(Continued)

FOREIGN PATENT DOCUMENTS

CN    1133996 A    10/1996
CN    1761989 A    4/2006
(Continued)

OTHER PUBLICATIONS

International Preliminary Report on Patentability from International Application No. PCT/US2013/065232, dated Apr. 30, 2015, 10 pp.

(Continued)

*Primary Examiner* — Haoshian Shih
(74) *Attorney, Agent, or Firm* — Shumaker & Sieffert, P.A.

(57) ABSTRACT

A graphical keyboard including a number of keys is output for display at a display device. The computing device receives an indication of a gesture to select at least two of the keys based at least in part on detecting an input unit at locations of a presence-sensitive input device. In response to the detecting and while the input unit is detected at the presence-sensitive input device: the computing device determines a candidate word for the gesture based at least in part on the at least two keys and the candidate word is output for display at a first location of the output device. In response to determining that the input unit is no longer detected at the presence-sensitive input device, the displayed candidate word is output for display at a second location of the display device.

14 Claims, 7 Drawing Sheets

Related U.S. Application Data

(60) Provisional application No. 61/714,651, filed on Oct. 16, 2012.

(51) Int. Cl.
   *G06F 3/0484*  (2013.01)
   *G06F 3/0488*  (2013.01)
   *G06F 3/023*   (2006.01)
   *G06F 3/01*    (2006.01)
   *G06F 3/041*   (2006.01)

(52) U.S. Cl.
   CPC .......... *G06F 3/0412* (2013.01); *G06F 3/0484* (2013.01); *G06F 3/04883* (2013.01); *G06F 3/04886* (2013.01)

(56) References Cited

U.S. PATENT DOCUMENTS

| | | | |
|---|---|---|---|
| 4,847,766 A | 7/1989 | McRae et al. | |
| 4,988,981 A | 1/1991 | Zimmerman et al. | |
| 5,075,896 A | 12/1991 | Wilcox et al. | |
| 5,307,267 A | 4/1994 | Yang | |
| 5,319,747 A | 6/1994 | Gerrissen et al. | |
| 5,440,070 A | 8/1995 | Okamoto et al. | |
| 5,502,803 A | 3/1996 | Yoshida et al. | |
| 5,521,986 A | 5/1996 | Curtin, II et al. | |
| 5,606,494 A | 2/1997 | Oshima et al. | |
| 5,677,710 A | 10/1997 | Thompson-Rohrlich | |
| 5,684,873 A | 11/1997 | Tiilikainen | |
| 5,717,939 A | 2/1998 | Bricklin et al. | |
| 5,748,512 A | 5/1998 | Vargas | |
| 5,761,689 A | 6/1998 | Rayson et al. | |
| 5,765,180 A | 6/1998 | Travis | |
| 5,781,179 A | 7/1998 | Nakajima et al. | |
| 5,784,504 A | 7/1998 | Anderson et al. | |
| 5,805,167 A | 9/1998 | van Cruyningen | |
| 5,845,306 A | 12/1998 | Schabes et al. | |
| 5,848,187 A | 12/1998 | Bricklin et al. | |
| 5,903,229 A | 5/1999 | Kishi | |
| 5,905,246 A | 5/1999 | Fajkowski | |
| 5,917,493 A | 6/1999 | Tan et al. | |
| 5,953,541 A | 9/1999 | King et al. | |
| 6,008,799 A | 12/1999 | Van Kleeck | |
| 6,032,053 A | 2/2000 | Schroeder et al. | |
| 6,041,292 A | 3/2000 | Jochim | |
| 6,047,300 A | 4/2000 | Walfish | |
| 6,057,845 A | 5/2000 | Dupouy | |
| 6,061,050 A | 5/2000 | Allport et al. | |
| 6,072,473 A | 6/2000 | Muller et al. | |
| 6,094,188 A | 7/2000 | Horton et al. | |
| 6,115,482 A | 9/2000 | Sears et al. | |
| 6,131,102 A | 10/2000 | Potter | |
| 6,150,600 A | 11/2000 | Buchla | |
| 6,160,555 A | 12/2000 | Kang et al. | |
| 6,278,453 B1 | 8/2001 | Bodnar | |
| 6,286,064 B1 | 9/2001 | King et al. | |
| 6,292,179 B1 | 9/2001 | Lee | |
| 6,310,634 B1 | 10/2001 | Bodnar et al. | |
| 6,340,979 B1 | 1/2002 | Beaton et al. | |
| RE37,654 E | 4/2002 | Longo | |
| 6,396,523 B1 | 5/2002 | Segal et al. | |
| 6,407,679 B1 | 6/2002 | Evans et al. | |
| 6,417,874 B2 | 7/2002 | Bodnar | |
| 6,424,983 B1 | 7/2002 | Schabes et al. | |
| 6,438,523 B1 | 8/2002 | Oberteuffer et al. | |
| 6,512,838 B1 | 1/2003 | Rafii et al. | |
| 6,542,170 B1 | 4/2003 | Williams et al. | |
| 6,570,557 B1 | 5/2003 | Westerman et al. | |
| 6,573,844 B1 | 6/2003 | Venolia et al. | |
| 6,630,924 B1 | 10/2003 | Peck | |
| 6,674,895 B2 | 1/2004 | Rafii et al. | |
| 6,686,931 B1 | 2/2004 | Bodnar | |
| 6,789,231 B1 | 9/2004 | Reynar et al. | |
| 6,801,190 B1 | 10/2004 | Robinson et al. | |
| 6,983,247 B2 | 1/2006 | Ringger et al. | |
| 7,028,259 B1 | 4/2006 | Jacobson | |
| 7,030,863 B2 | 4/2006 | Long et al. | |
| 7,042,443 B2 | 5/2006 | Woodard et al. | |
| 7,075,520 B2 | 7/2006 | Williams | |
| 7,088,345 B2 | 8/2006 | Robinson et al. | |
| 7,098,896 B2 | 8/2006 | Kushler et al. | |
| 7,145,554 B2 | 12/2006 | Bachmann | |
| 7,151,530 B2 | 12/2006 | Roeber et al. | |
| 7,170,430 B2 | 1/2007 | Goodgoll | |
| 7,199,786 B2 | 4/2007 | Suraqui | |
| 7,207,004 B1 | 4/2007 | Harrity | |
| 7,231,343 B1 | 6/2007 | Treadgold et al. | |
| 7,250,938 B2 | 7/2007 | Kirkland et al. | |
| 7,251,367 B2 | 7/2007 | Zhai | |
| 7,277,088 B2 | 10/2007 | Robinson et al. | |
| 7,296,019 B1 | 11/2007 | Chandrasekar et al. | |
| 7,336,827 B2 | 2/2008 | Geiger et al. | |
| 7,366,983 B2 | 4/2008 | Brill et al. | |
| 7,382,358 B2 | 6/2008 | Kushler et al. | |
| 7,453,439 B1 | 11/2008 | Kushler et al. | |
| 7,479,949 B2 | 1/2009 | Jobs et al. | |
| 7,487,461 B2 | 2/2009 | Zhai et al. | |
| 7,508,324 B2 | 3/2009 | Suraqui | |
| 7,542,029 B2 | 6/2009 | Kushler | |
| 7,706,616 B2 | 4/2010 | Kristensson | |
| 7,716,579 B2 | 5/2010 | Gunn et al. | |
| 7,730,402 B2 | 6/2010 | Song | |
| 7,750,891 B2 | 7/2010 | Stephanick et al. | |
| 7,809,719 B2 | 10/2010 | Furuuchi et al. | |
| 7,831,423 B2 | 11/2010 | Schubert | |
| 7,880,730 B2 | 2/2011 | Robinson et al. | |
| 7,886,233 B2 | 2/2011 | Rainisto et al. | |
| 7,895,518 B2 | 2/2011 | Kristensson | |
| 7,907,125 B2 | 3/2011 | Weiss et al. | |
| 7,920,132 B2 | 4/2011 | Longe et al. | |
| 7,921,361 B2 | 4/2011 | Gunn et al. | |
| 7,973,770 B2 | 7/2011 | Tokkonen | |
| 8,036,878 B2 | 10/2011 | Assadollahi | |
| 8,059,101 B2 | 11/2011 | Westerman et al. | |
| 8,135,582 B2 | 3/2012 | Suraqui | |
| 8,232,972 B2 | 7/2012 | Huang et al. | |
| 8,232,973 B2 | 7/2012 | Kocienda et al. | |
| 8,266,528 B1 | 9/2012 | Hayes | |
| 8,280,886 B2 | 10/2012 | Labrou et al. | |
| 8,359,543 B2 | 1/2013 | Sengupta | |
| 8,438,160 B2 | 5/2013 | Aravamudan et al. | |
| 8,504,349 B2 | 8/2013 | Manu et al. | |
| 8,514,178 B2 | 8/2013 | Song et al. | |
| 8,542,206 B2 | 9/2013 | Westerman et al. | |
| 8,552,984 B2 | 10/2013 | Knaven | |
| 8,587,542 B2 | 11/2013 | Moore | |
| 8,619,048 B2 | 12/2013 | Shimoni | |
| 8,667,414 B2 | 3/2014 | Zhai et al. | |
| 8,701,032 B1 | 4/2014 | Zhai et al. | |
| 8,819,574 B2 | 8/2014 | Ouyang et al. | |
| 8,843,845 B2 | 9/2014 | Ouyang et al. | |
| 2002/0013794 A1 | 1/2002 | Carro et al. | |
| 2002/0015064 A1 | 2/2002 | Robotham et al. | |
| 2002/0129012 A1 | 9/2002 | Green | |
| 2002/0143543 A1 | 10/2002 | Sirivara | |
| 2002/0194223 A1 | 12/2002 | Meyers et al. | |
| 2003/0006967 A1 | 1/2003 | Pihlaja | |
| 2003/0095053 A1 | 5/2003 | Kandogan et al. | |
| 2003/0095104 A1 | 5/2003 | Kandogan et al. | |
| 2003/0097252 A1 | 5/2003 | Mackie | |
| 2003/0165801 A1 | 9/2003 | Levy | |
| 2004/0120583 A1 | 6/2004 | Zhai | |
| 2004/0140956 A1* | 7/2004 | Kushler | G06F 3/04883 345/168 |
| 2005/0052406 A1 | 3/2005 | Stephanick et al. | |
| 2005/0114115 A1 | 5/2005 | Karidis et al. | |
| 2005/0146508 A1 | 7/2005 | Kirkland et al. | |
| 2005/0171783 A1 | 8/2005 | Suominen | |
| 2005/0190973 A1 | 9/2005 | Kristensson et al. | |
| 2006/0004638 A1 | 1/2006 | Royal et al. | |
| 2006/0026536 A1 | 2/2006 | Hotellings et al. | |
| 2006/0028450 A1 | 2/2006 | Suraqui | |
| 2006/0050962 A1 | 3/2006 | Geiger et al. | |

(56) References Cited

U.S. PATENT DOCUMENTS

| | | |
|---|---|---|
| 2006/0053387 A1 | 3/2006 | Ording |
| 2006/0055669 A1 | 3/2006 | Das |
| 2006/0119582 A1 | 6/2006 | Ng et al. |
| 2006/0173674 A1 | 8/2006 | Nakajima et al. |
| 2006/0176283 A1 | 8/2006 | Suraqui |
| 2006/0253793 A1 | 11/2006 | Zhai et al. |
| 2006/0256139 A1 | 11/2006 | David |
| 2006/0265648 A1 | 11/2006 | Rainisto et al. |
| 2007/0016862 A1 | 1/2007 | Kuzmin |
| 2007/0040813 A1 | 2/2007 | Kushler et al. |
| 2007/0083276 A1 | 4/2007 | Song |
| 2007/0089070 A1 | 4/2007 | Jaczyk |
| 2007/0094024 A1 | 4/2007 | Kristensson et al. |
| 2007/0152980 A1 | 7/2007 | Kocienda et al. |
| 2007/0213983 A1 | 9/2007 | Ramsey |
| 2008/0017722 A1 | 1/2008 | Snyder et al. |
| 2008/0100579 A1 | 5/2008 | Robinson et al. |
| 2008/0122796 A1 | 5/2008 | Jobs et al. |
| 2008/0167858 A1 | 7/2008 | Christie et al. |
| 2008/0172293 A1 | 7/2008 | Raskin et al. |
| 2008/0229255 A1 | 9/2008 | Linjama et al. |
| 2008/0232885 A1 | 9/2008 | Mock et al. |
| 2008/0240551 A1 | 10/2008 | Zitnick et al. |
| 2008/0270896 A1* | 10/2008 | Kristensson .......... G06F 3/0237 715/261 |
| 2008/0316183 A1 | 12/2008 | Westerman et al. |
| 2009/0058823 A1* | 3/2009 | Kocienda .............. G06F 3/0236 345/173 |
| 2009/0077464 A1 | 3/2009 | Goldsmith et al. |
| 2009/0100338 A1 | 4/2009 | Saetti |
| 2009/0100383 A1 | 4/2009 | Sunday et al. |
| 2009/0119376 A1 | 5/2009 | Bomma |
| 2009/0189864 A1 | 7/2009 | Walker et al. |
| 2009/0249198 A1 | 10/2009 | Davis et al. |
| 2010/0021871 A1 | 1/2010 | Layng et al. |
| 2010/0070908 A1 | 3/2010 | Mori et al. |
| 2010/0079382 A1 | 4/2010 | Suggs |
| 2010/0125594 A1 | 5/2010 | Li et al. |
| 2010/0131447 A1 | 5/2010 | Creutz et al. |
| 2010/0141484 A1 | 6/2010 | Griffin |
| 2010/0199226 A1 | 8/2010 | Nurmi |
| 2010/0235780 A1 | 9/2010 | Westerman et al. |
| 2010/0238125 A1 | 9/2010 | Ronkainen |
| 2010/0257478 A1 | 10/2010 | Longe et al. |
| 2010/0259493 A1 | 10/2010 | Chang et al. |
| 2010/0271299 A1 | 10/2010 | Stephanick et al. |
| 2010/0315266 A1 | 12/2010 | Gunawardana et al. |
| 2011/0010174 A1 | 1/2011 | Longe et al. |
| 2011/0061017 A1 | 3/2011 | Ullrich et al. |
| 2011/0063224 A1 | 3/2011 | Vexo et al. |
| 2011/0063231 A1 | 3/2011 | Jakobs et al. |
| 2011/0066984 A1 | 3/2011 | Li |
| 2011/0071834 A1 | 3/2011 | Kristensson et al. |
| 2011/0103682 A1 | 5/2011 | Chidlovskii et al. |
| 2011/0107206 A1 | 5/2011 | Walsh et al. |
| 2011/0119617 A1 | 5/2011 | Kristensson et al. |
| 2011/0122081 A1 | 5/2011 | Kushler |
| 2011/0141027 A1 | 6/2011 | Ghassabian |
| 2011/0141031 A1 | 6/2011 | McCullough et al. |
| 2011/0179380 A1 | 7/2011 | Shaffer et al. |
| 2011/0179386 A1 | 7/2011 | Shaffer et al. |
| 2011/0179387 A1 | 7/2011 | Shaffer et al. |
| 2011/0181526 A1 | 7/2011 | Shaffer et al. |
| 2011/0202834 A1 | 8/2011 | Mandryk et al. |
| 2011/0202836 A1 | 8/2011 | Badger et al. |
| 2011/0205160 A1 | 8/2011 | Song et al. |
| 2011/0208511 A1 | 8/2011 | Sikstrom et al. |
| 2011/0208513 A1 | 8/2011 | Nicks et al. |
| 2011/0209088 A1 | 8/2011 | Hinckley et al. |
| 2011/0210850 A1 | 9/2011 | Tran |
| 2011/0234524 A1 | 9/2011 | Longe et al. |
| 2011/0242000 A1 | 10/2011 | Bi et al. |
| 2011/0254798 A1 | 10/2011 | Adamson et al. |
| 2011/0291940 A1 | 12/2011 | Ghassabian |
| 2012/0011462 A1 | 1/2012 | Westerman et al. |
| 2012/0029910 A1 | 2/2012 | Medlock et al. |
| 2012/0036468 A1 | 2/2012 | Colley |
| 2012/0036469 A1 | 2/2012 | Suraqui |
| 2012/0046544 A1 | 2/2012 | Inoue |
| 2012/0075190 A1 | 3/2012 | Sengupta |
| 2012/0079412 A1 | 3/2012 | Kocienda et al. |
| 2012/0098846 A1 | 4/2012 | Wun et al. |
| 2012/0113008 A1 | 5/2012 | Makinen et al. |
| 2012/0127080 A1 | 5/2012 | Kushler et al. |
| 2012/0127082 A1 | 5/2012 | Kushler et al. |
| 2012/0131035 A1 | 5/2012 | Yang et al. |
| 2012/0131514 A1 | 5/2012 | Ansell et al. |
| 2012/0162092 A1 | 6/2012 | Pasquero et al. |
| 2012/0166428 A1 | 6/2012 | Kakade et al. |
| 2012/0223889 A1 | 9/2012 | Medlock et al. |
| 2012/0242579 A1 | 9/2012 | Chua |
| 2012/0259615 A1 | 10/2012 | Morin et al. |
| 2012/0274745 A1 | 11/2012 | Russell |
| 2012/0290946 A1 | 11/2012 | Schrock et al. |
| 2012/0310626 A1 | 12/2012 | Kida et al. |
| 2013/0046544 A1 | 2/2013 | Kay et al. |
| 2013/0074014 A1 | 3/2013 | Ouyang et al. |
| 2013/0082824 A1 | 4/2013 | Colley |
| 2013/0120266 A1 | 5/2013 | Griffin et al. |
| 2013/0120430 A1 | 5/2013 | Li et al. |
| 2013/0125034 A1 | 5/2013 | Griffin et al. |
| 2013/0135209 A1 | 5/2013 | Zhai et al. |
| 2013/0176228 A1 | 7/2013 | Griffin et al. |
| 2013/0205242 A1 | 8/2013 | Colby |
| 2013/0212515 A1 | 8/2013 | Eleftheriou |
| 2013/0332822 A1 | 12/2013 | Willmore et al. |

FOREIGN PATENT DOCUMENTS

| | | |
|---|---|---|
| CN | 100472600 C | 3/2009 |
| CN | 101390039 A | 3/2009 |
| CN | 101393506 A | 3/2009 |
| CN | 101689189 A | 3/2010 |
| CN | 101788855 A | 7/2010 |
| CN | 102411477 A | 4/2012 |
| CN | 102508553 A | 6/2012 |
| CN | 102541304 A | 7/2012 |
| CN | 102576255 A | 7/2012 |
| CN | 102629158 A | 8/2012 |
| CN | 102693090 A | 9/2012 |
| EP | 0844570 A2 | 5/1998 |
| EP | 1603014 A1 | 7/2005 |
| EP | 1860576 A1 | 11/2007 |
| EP | 1887451 A3 | 6/2009 |
| EP | 2369446 A2 | 9/2011 |
| TW | 201040793 A1 | 11/2010 |
| WO | 2004/066075 A2 | 8/2004 |
| WO | 2005064587 A2 | 7/2005 |
| WO | 2007/017660 A2 | 2/2007 |
| WO | 2007035827 A2 | 3/2007 |
| WO | 2008/013658 A1 | 1/2008 |
| WO | 2011/113057 A1 | 9/2011 |
| WO | 2013107998 A1 | 7/2013 |

OTHER PUBLICATIONS

"7 Swype keyboard lips for better Swyping," by Ed Rhee, found at http://howto.cnel. com/8301-1131 0_39-20070627-285/7-swype-keyboard-lips-for-belter-swyping/, posted Jun. 14, 2011, 5 pp.

"Advanced tips for Swype," found at www.swype.com.lips/advanced-lips/, downloaded Aug. 20, 2012, 3 pp.

"How to Type Faster with the Swype Keyboard for Android—How-To Geek." found at www.how 1 ogeek.com/1 06643/ how-to-type-faster-with-the-swype-keyboard-for-android/, downloaded Jun. 4, 2012, 13 pp.

"Keymonk Keyboard Free—Android Apps on Google Play, Description," found at https:l/play.google.com/slore/apps/details?id=com.keymonk.lalin&hl=en, downloaded Oct. 3, 2012, 2 pp.

"Keymonk Keyboard Free—Android Apps on Google Play, Permissions," found at.hllps:l/play.google.com/slore/apps/

(56) References Cited

OTHER PUBLICATIONS delails?id=com.keymonk.lalin&hl=en, downloaded Oct. 3, 2012, 2 pp.
"Keymonk Keyboard Free—Android Apps on Google Play. User Reviews," found at hllps:1/play.google.com/slore/apps/delails?id=com.keymonk.lalin&hl=en, downloaded Oct. 3, 2012, 2 pp.
"Keymonk—The Future of Smartphone Keyboards," found at www.keymonk.com, downloaded Sep. 5, 2012, 2 pp.
"Nuance Supercharges Swype, Adds New Keyboard Options, XT9 Predictive Text, and Dragon-Powered Voice Input," found at http://techcrunch.com/2012/06/20/nuance-supercharges-swype-adds-new-keyboard-options-xt9-predictive—text-and-dragon-powered-voice-input/, downloaded Jun. 4, 2012, 2 pp.
"Sensory Software—Text Chat, found at www.sensorysoftware.com/textchat.html," downloaded Jun. 4, 2012, 3 pp.
"ShapeWriter Keyboard allows you to input on Android the same experience with on PC, Android forums," found at talkandroid.com/ .. /2767—shapewriter—keyboard-allows-you-input-android-same-experience-pc. hlml, last updated Oct. 25, 2009, 3 pp.
"ShapeWriter Research Project home page," accessed May 25, 2012, found at http://www.almaden.ibm.com/u/zhai/ shapewriter_research.htm, 12 pp.
"ShapeWriter vs Swype Keyboard, DroidForums.net," found at www.droidforums.nel/forum/droid-applications/48707—shapewriter-vs-swype-keyboard.hlml, last updated Jun. 1, 2010, 5 pp.
"SlideiT Soft Keyboard", SlideiT [online]. First accessed on Jan. 31, 2012. Retrieved from the Internet: <https:1 play .google .com/store/apps/details?id=com .dasur.slideit. vt.l ite&h l=en>4 pgs.
"Split Keyboard for iPad [Concept]," by Skipper Eye, Apr. 23, 2010, found at http://www.redmondpie.com/splil—keyboard-for-ipad-9140675/, 6 pp.
"Split Keyboard for Thumb Typing Coming to iPad with iOS 5," by Kevin Purcell, Jun. 6, 2011, found at http://www. gottabemobi I e. com/20 11 /06/06/spl it-keyboard-for—thumb-typing-coming-to-ipad-with-ios-5/, 8 pp.
"SwiftKey counters Swipe with a Smarter Version Makes an In-Road Into Healthcare Market," makes-an-in-road-into-healthcare—market/, Jun. 21, 2012, 2 pp.
"SwiftKey Keyboard—Android Apps on Google Play," found at https:1/play.google.com/store/apps/details?id=com. touchtype.swiftkey&hl=en. accessed on Jun. 8, 2012, 3 pp.
"SwiftKey 3 Keyboard—Android Apps on Google Play," found atweb.archive.org/web/20121127141326/hllps://play.google.com/store/apps/details?id=com.louchtype.swiflkey&hl=en, accessed on Nov. 27, 2012, 4 pp.
"Swipe Nuance Home, Type Fast, Swipe Faster," found at http:1/www.swipe.com/, accessed on May 25, 2012, 1 p.
"Swype—Swype Basics," found at www.swype.com/tips/swype-basics/, downloaded Jun. 8, 2012, 2 pp.
Text input for future computing devices (SHARK shorthand and ATOMIK). SHARK Shorthand Home Page, retrieved from http://www.almaden.ibm.com/u/zhai/lopics/virtualkeyboard.htm, accessed on Sep. 20, 2012, 4 pp.
"Welcome to CooTek—TouchPal, an innovative soft keyboard," Touch Pal v1.0 for Android will Release Soon!, found at www.cootek.com/intro-android.aspx, downloaded Aug. 20, 2012, 2 pp.
"Why your typing sucks on Android, and how to fix it," by Martin Bryant, Mar. 3, 2010, found at thenextweb.com/ mobile/201 0/03/03/lyping-sucks-android-fix/, 3 pp.
Accot et al., "Refining Fitts' Law Models for Bivariate Pointing," IBM Almaden Research Center, Paper: Pointing and Manipulating, Apr. 5-10, 2003, pp. 193-200.
Alkanhal, et al., "Automatic Stochastic Arabic Spelling Correction with Emphasis on Space Insertions and Deletions," IEEE Transactions on Audio, Speech, and Language Processing, vol. 20(7), Sep. 2012, 12 pp.
"Avoid iPhone navigation and typing hassles," by Ted Landau, Dec. 28, 2007, found at www.macworld.com/ article/1131264/tco_iphone .htm I, 9 pp.
Bellegarda, "Statistical Language Model Adaptation: Review and Perspectives", Speech Communication 42, Jan. 2004, pp. 93-108.
CiteSeer, "Token Passing: a Simple Conceptual Model for Connected Speech Recognition Systems" (1989), by S.J. Young et al., found at (hllp:citeseerx.isl.psu.edu/viewdoc/summary?doi=10.1.1. 17.7829), accessed on Apr. 30, 2012, 2 pp.
Dasur Pattern Recognition Ltd. SlideiT Keyboard—User Guide, Jul. 2011, found at http://www.mobiletextinput.com/App_O pen/Manuai/SlideiT_UserGuide%5BEnglish%5Dv4.0.pdf, 21 pp.
Goodman et al., "Language Modeling for Soft Keyboards," Microsoft Research, Nov. 28, 2001, 9 pp.
Goodman et al., Language Modeling for Soft Keyboards, Proceedings of the 7th International Conference on Intelligent user interfaces, Jan. 13-16, 2002, pp. 194-195.
Goodman, "A Bit of Progress in Language Modeling Extended Version," Machine Learning and Applied Statistics Group, Microsoft Corporation, Aug. 2001, 73 pp.
Goodman, "A bit of progress in Language Modeling," Computer Speech & Language, Oct. 2001, pp. 403-434.
Gunawardana et al., "Usability Guided Key-Target Resizing for Soft Keyboards," Proceedings of the 15th International Conference on Intelligent user interfaces, Feb. 7-10, 2010, pp. 111-118.
Harb et al., "Back-off Language Model Compression," Google Inc., 2009, 4 pp.
Kane et al., "TrueKeys: Identifying and Correcting Typing Errors for People with Motor Impairments,"Proceedings of the 13th International Conference on Intelligent User Interfaces, 1UI '08, Jan. 13, 2008, 4 pp.
Karch, "Typing, Copy, and Search," Android Tablets Made Simple, Nov. 18, 2011, 13 pp.
Keymonk Keyboard Free—Android Apps on Google Play, What's New, found at hllps:1/play.google.com/slore/apps/ delails?id=com.keymonk.lalin&hl=en, downloaded Oct. 3, 2012, 2 pp.
Kristensson et al., "Command Strokes with and without Preview: Using Pen Gestures on Keyboard for Command Selection," CHI Proceedings, San Jose, CA, USA, Apr. 28-May 3, 2007, 10 pp.
Kristensson et al., "Relaxing Stylus Typing Precision by Geometric Pattern Matching," Proceedings of the 1 oth International Conference on Intelligent User Interfaces, Jan. 9-12, 2005, pp. 151-158.
Kristensson et al., "SHARK2: A Large Vocabulary Shorthand Writing System for Pen-based Computers", UIST 2004, Proceedings of the 17th Annual ACM Symposium on User Interface Software and Technology, pp. 43-52.
Landau, "Android OS—Language & keyboard settings," found at support.google.com/ics/nexus/bin/answer.py?hl=en&answer=168584, downloaded Jun. 4, 2012, 3 pp.
Li, "Protractor: A Fast and Accurate Gesture Recognizer" CHI2010, Apr. 10-15, 2010, Atlanta, Georgia, pp. 2169-2172.
Lomas, "Hey Apple, What the Next iPhone Really, Really Needs Is a Much Better Keyboard," http://techcrunch. com/2013/04/21/the-iphone-keyboard-stinks/?, Apr. 21, 2013, 6 pgs.
MacKenzie et al., "LetterWise: Prefix-based Disambiguation for Mobile Text Input," Proceedings of the 14th Annual ACM Symposium on User Interface Software and Technology, Nov. 11-14, 2001, pp. 111-120.
Marziah, "Typing, copying and Search," Android Tables Made Simple, Nov. 18, 2011, 7 pages.
Mohri et al., "Speech Recognition With Weighted Finite-State Transducers," Springer Handbook on Speech Processing and Speech Communication, 2008, 31 pp.
Naseem, "A Hybrid Approach for Urdu Spell Checking", National University of Computer & Emerging Sciences, Nov. 2004, 87 pp.
Rybach et al., "Silence is Golden: Modeling Non-speech Events in WFST-Based Dynamic Network Decoders," Human Language Technology and Pattern Recognition, Computer Science Department RWTH Aachen University, Mar. 2012, 4pp.
SlideiT Soft Keyboard, SlideIT [online], First accessed on Jan. 31, 2012, retrieved from the Internet: https://play.google.com/store/apps/details?id=com .dasur.slideit.vt.1 ite&h l=en>, 4 pp.
Suraqui, U.S. Appl. No. 60/505,724, filed Sep. 22, 2003, 47 pgs.

(56) References Cited

OTHER PUBLICATIONS

Tappert et al., "The State of the Art in On-Line Handwriting Recognition," IEEE Transactions on Pattern Analysis and Machine Intelligence, vol. 12, No. 8, Aug. 1990, pp. 787-808.
Williamson et al., "Hex: Dynamics and Probabilistic Text Entry," Switching and Learning LNCS 3355, pp. 333-342, 2005.
Wobbrock et al., "$1 Unistroke Recognizer in JavaScript," [online], first accessed on Jan. 24, 2012, retrieved from the Internet: http://depts.washington.edu/aimgroup/proj/dollar/>, 2 pp.
Wobbrock et al., "Gestures without Libraries, Toolkits or Training. A $1 Recognizer for User Inter face Prototypes," UIST 2007, Proceedings of the 2oth Annual ACM Symposium on User Interface Software and Technology, Aug. 19, 2007, pp. 159-168.
Young et al., "Token Passing: a Simple Conceptual Model for Connected Speech Recognition Systems," Cambridge University Engineering Department, Jul. 31, 1989, 23 pp.
Youtube, "Automatic error correction on graphical keyboard," Retrieved from http://www.youtube.com/watch? v=_VgYrz7Pi60, Uploaded on Jun. 14, 2007, 1 p.
Youtube, "BlindType—Demo 1 ," Retrieved from http://www.youtube.com/watch?v=M9b8NIMd79w, Uploaded on Jul. 17, 2010, 1 p.
Youtube, "BlindType—Demo 2," Retrieved from http://www.youtube.com/watch?v=7gDF4ocLhQM, Uploaded on Aug. 2, 2010, 1 p.
Youtube, "BlindType on Android," Retrieved from http://www.youtube.com/watch?v=m6eKm1gUnTE, Uploaded on Aug. 7, 2010, 1 p.
Youtube, "BlindType—Thank you!," Retrieved from http://www.youtube.com/watch?v=KTw4JexFW—o, Uploaded on Jul. 22, 2010, 1 p.
Zhai et al., "In search of effective text input interfaces for off the desktop computing," Interacting with Computers Feb. 17, 2004, pp. 229-250.
Zhai,"Text input for future computing devices (SHARK shorthand and ATOMIK)," SHARK Shorthand [online]. Apr. 23, 2012. First Accessed on Jan. 31, 2014. Retrieved from the Internet: <https:1/web.archive.org/web/2012042301358/http://www.almaden.ibm.com/u/zhai/topics/virtualkeyboard.htm>(3 pgs.).
International Search Report and Written Opinion from International Application No. PCT/US2013/065232, dated Mar. 13, 2014, 14 pp.
Prosecution History from U.S. Appl. No. 13/793,825 dated from Jul. 5, 2013 through May 22, 2014, 81 pp.
First Office Action, and translation thereof, from counterpart Chinese Patent Application No. 201380054118.6, dated Aug. 30, 2016, 22 pp.

\* cited by examiner

PARTIAL GESTURE TEXT ENTRY

This application is a continuation of U.S. application Ser. No. 13/793,825, filed Mar. 11, 2013, which claims the benefit of U.S. Provisional Application No. 61/714,651, filed Oct. 16, 2012, the entire contents of each of which are incorporated herein in its entirety.

BACKGROUND

Some computing devices (e.g., mobile phones, tablet computers) may receive user input that is entered at a presence-sensitive display. For instance, a presence-sensitive display of a computing device may output a graphical (or "soft") keyboard that permits the user to enter data by tapping and/or gesturing over graphical elements (e.g., keys) displayed at the presence-sensitive display. In other examples, a presence-sensitive display of a computing device may output a graphical user interface (e.g., an interface of a game or an operating system) that permits the user to enter commands by tapping and/or gesturing over other graphical elements (e.g., buttons, scroll bars) displayed at the presence-sensitive display. Some computing devices perform specific functions in response to receiving either a tap or a non-tap gesture input. For instance, some computing devices may detect a selection of a single key in response to a tap entered at or proximate to a presence-sensitive display and may detect a selection of multiple keys in response to a non-tap gesture (e.g., a swipe) entered at or proximate to the presence-sensitive display.

In some cases, a computing device may present a continuous-gesture graphical keyboard (sometimes referred to as a "combo gesture keyboard," or "gesture keyboard") with which a user can interact by inputting a continuous gesture that indicates a word to be input to the computing device (e.g., by sliding his or her finger over various regions of the presence-sensitive display associated with desired keys of the keyboard). In this way, continuous-gesture graphical keyboards allow a user to enter a word or group of words with a single gesture. As such, a continuous-gesture graphical keyboard may allow the user to achieve a certain degree of input efficiency.

However, some continuous-gesture keyboards have certain drawbacks. For instance, when performing a continuous gesture to input a word with many characters, a continuous-gesture keyboard may require a user to select all of characters corresponding to a word before the computing device selects the word as the intended user input. Inputting words with many characters (e.g., longer words) may therefore become tedious and/or require additional user time and effort. As such, selecting every key corresponding to a respective character of a word before the computing device outputs the word may reduce the speed at which the user is able to interact with the computing device.

SUMMARY

In one example, a method includes outputting, by a computing device and for display at a display device, a graphical keyboard comprising a plurality of keys. The method also includes receiving, by the computing device, an indication of a gesture at a presence-sensitive input device to select fewer than all of the plurality of keys corresponding to a candidate word, based at least in part on detecting an input unit at a plurality of locations of the a presence-sensitive input device. The method also includes, in response to the detecting and while the input unit is detected at the presence-sensitive input device: determining, by the computing device, the candidate word for the gesture based at least in part on the at least two keys; and outputting the candidate word for display at a first location of the display device. The method also includes, in response to determining that the gesture has terminated prior to selecting all of the plurality of keys corresponding to the candidate word, outputting the displayed candidate word for display at a second location of the display device.

In another example, a computing device, includes at least one processor, a presence-sensitive input device that is operatively coupled to the at least one processor, and a display device that is operatively coupled to the at least one processor. The at least one processor of the computing device may be configured to output, for display at the display device, a graphical keyboard comprising a plurality of keys. The at least one processor of the computing device may also be configured to receive an indication of a gesture to select at least two of the plurality of keys based at least in part on detecting an input unit at a plurality of locations of the display device. The at least one processor of the computing device may be configured to, in response to the detecting and while the input unit is detected at the presence-sensitive input device: determine a candidate word for the gesture based at least in part on the at least two keys; and output the candidate word for display at a first location of the display device. The at least one processor of the computing device may be configured to, in response to determining that the input unit is no longer detected at the presence-sensitive input device, output the displayed candidate word for display at a second location of the display device.

In another example, a computer-readable storage medium is encoded with instructions that, when executed, cause at least one processor of a computing device to output, for display at a display device, a graphical keyboard comprising a plurality of keys; receive, by the computing device, an indication of a gesture to select at least two of the plurality of keys based at least in part on detecting an input unit at a plurality of locations of a presence-sensitive input device; in response to the detecting and while the input unit is detected at the presence-sensitive input device: determine, by the computing device, a candidate word for the gesture based at least in part on the at least two keys; output the candidate word for display at a first location of the display device; and in response to determining that the input unit is no longer detected at the presence-sensitive input device, output the displayed candidate word for display at a second location of the display device.

The details of one or more aspects of this disclosure are set forth in the accompanying drawings and the description below. Other features, objects, and advantages of the disclosure will be apparent from the description and drawings, and from the claims.

DETAILED DESCRIPTION

In general, this disclosure is directed to techniques for inputting a word using a graphical keyboard without requiring a gesture that selects all of the characters included in the word. That is, in response to receiving an indication of a continuous gesture to select a portion of characters included in a word, the computing device may select the word. In this way, the computing device may select the word, although the continuous gesture may have terminated prior to selecting all of the characters included in the word (e.g., selecting fewer than all of the keys associated with characters corresponding to a candidate word). As such, a computing device, according to techniques of the disclosure, may perform word recognition techniques while the computing device detects a gesture and generate candidate words prior to completion of the gesture. In some examples, the computing device may output a candidate word above the current position of the tip of the user's finger or at the position of another input unit employed by the user. In one example, if the computing device determines a candidate word based on only a portion of characters and the user wishes to select the candidate word, the user can terminate the gesture (e.g., by lifting the finger from the presence-sensitive display). Responsive to determining that the gesture is terminated, the computing device may select the candidate word and enter the candidate word as the inputted word as if the gesture had traveled along the path corresponding to all of the letters of the candidate word.

As one example, a computing device may receive an indication of a partial gesture for the word "friend." For instance, the computing device may determine that the partial gesture indicates the characters f-r-i-e. Based on the indication of the partial gesture, the computing device may determine a candidate word "friend," which is output for display at a presence-sensitive display. Rather than requiring the user to continue performing the gesture to select the remaining letters of "friend," the computing device may, in response to determining the gesture has terminated, select the word "friend" as the inputted word.

Figure 1:
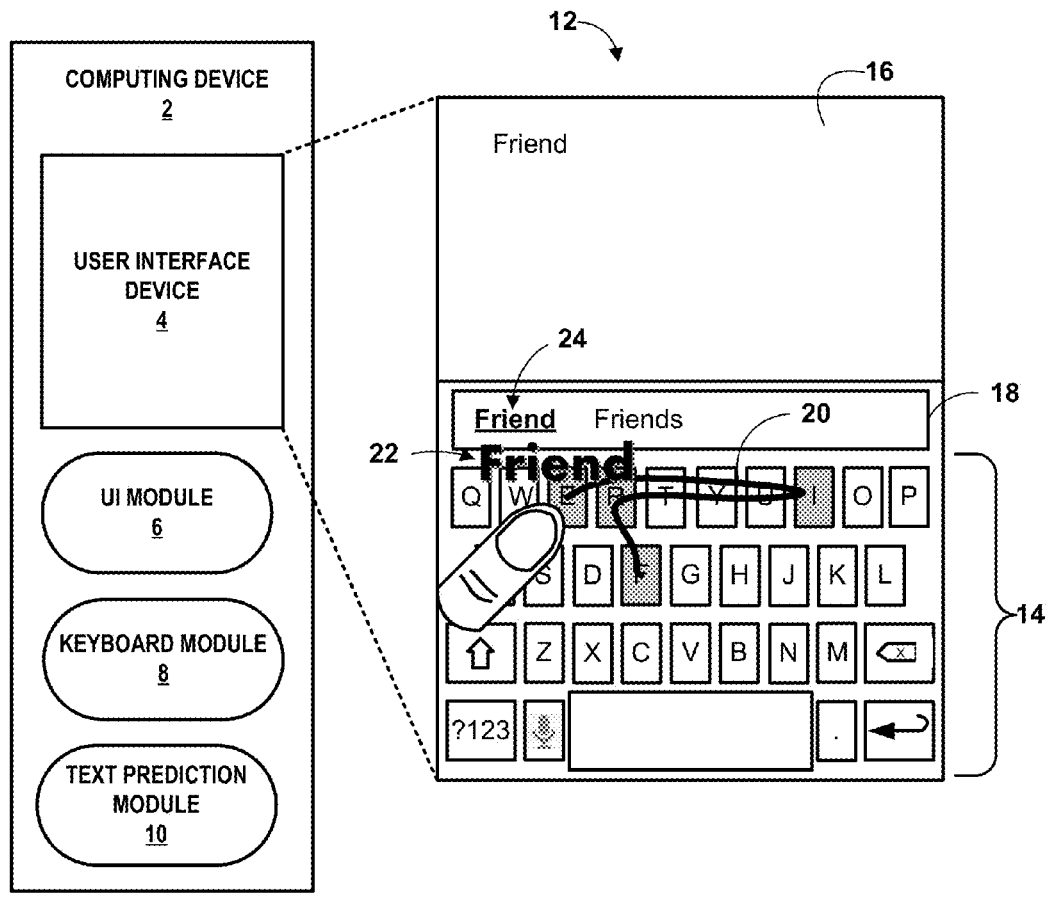
FIG. 1 is a block diagram illustrating an example computing device that may be configured to display a partial gesture graphical keyboard.

FIG. 1 is a block diagram illustrating an example computing device 2 including user interface (UI) device 4, UI module 6, keyboard module 8, and text prediction module 10. Other examples of computing device 2 that implement techniques of this disclosure may include additional components not shown in FIG. 1. In some examples, computing device 2 may be employed by a user. The user may interact with computing device 2 via UI device 4. For instance, the user may provide a gesture at UI device 4, which may detect such gestures. Examples of computing device 2 may include, but are not limited to, portable or mobile devices such as mobile phones (including smart phones), laptop computers, desktop computers, tablet computers, smart television platforms, cameras, personal digital assistants (PDAs), servers, mainframes, etc.

Example computing device 2 includes UI device 4. In some examples, UI device 4 is configured to receive tactile, audio, or visual input. UI device 4, as shown in FIG. 1, may include a touch-sensitive and/or presence-sensitive display or any other type of device for receiving input. UI device 4 may output content such as graphical user interface (GUI) 12 for display. In the example of FIG. 1, UI device 4 may be a presence-sensitive display that can display GUI 12 and receive input from a user using capacitive, inductive, and/or optical detection at or near the presence-sensitive display. In one example, UI device 4 may detect gesture inputs from the user that are provided by an input unit, e.g., the user's finger or a stylus device positioned at or near UI device 4. Additionally, UI device 4 may, for example, output partial gesture graphical keyboard 14. In response to receiving an indication of user input at UI device 4, computing device 2 may determine a predictive text recognition result. As further described below, computing device 2 may select a complete word or other text before the user finishes an entire gesture to input the word at UI device 4.

As shown in FIG. 1, computing device 2 includes UI module 6. UI module 6 may perform one or more functions to receive input, such as user input or network data, and send such input to other components associated with computing device 2, such as keyboard module 8 and text prediction module 10. For example, UI module 6 may identify a gesture performed by a user at UI device 4. UI module 6 may also receive data from components associated with computing device 2, such as keyboard module 8 and text prediction module 10. Using the data, UI module 6 may cause other components associated with computing device 2, such as UI device 4, to provide output based on the data. For instance, UI module 6 may receive data from text prediction module 10 that causes UI device 4 to display information in text entry area 16 of GUI 12.

UI module 6 may be implemented in various ways. For example, UI module 6 may be implemented as a downloadable or pre-installed application or "app." In another example, UI module 6 may be implemented as part of a hardware unit of computing device 2. In another example, UI module 6 may be implemented as part of an operating system of computing device 2.

Example computing device 2 also includes keyboard module 8. Keyboard module 8 may include functionality to present and control graphical keyboard 14 included in GUI 12 presented at UI device 4. Keyboard module 8 may be implemented in various ways. For example, keyboard module 8 may be implemented as a downloadable or pre-installed application or "app." In another example, keyboard module 8 may be implemented as part of a hardware unit of computing device 2. In another example, keyboard module 8 may be implemented as part of an operating system of computing device 2.

Keyboard module 8 may receive data from components associated with computing device 2, such as UI module 6. For instance, keyboard module 8 may receive gesture data from UI module 6 that causes keyboard module 8 to modify the display of graphical keyboard 14 based on the gesture data. Keyboard module 8 may also send data to components associated with computing device 2, such as UI module 6. For instance, keyboard module 8 may send data associated with graphical keyboard 14 to UI module 6 that causes UI device 4 to display GUI 12 including keyboard 14 according to the data sent by keyboard module 8.

Example computing device 2 of FIG. 1 also includes text prediction module 10. Text prediction module 10 includes functionality to incrementally determine a candidate word or words for a partial gesture to select keys of graphical keyboard 14 received at UI device 4 and identified by UI module 6. Text prediction module 10 may be implemented in various ways. For example, text prediction module 10 may be implemented as a downloadable or pre-installed application or "app." In another example, text prediction module 10 may be implemented as part of a hardware unit of computing device 2. In another example, text prediction module 10 may be implemented as part of an operating system of computing device 2.

Text prediction module 10 may receive data from components associated with computing device 2, such as UI module 6. For instance, text prediction module 10 may receive gesture data from UI module 6 that causes text prediction module 10 to determine candidate words from the gesture data. Text prediction module 10 may also send data to components associated with computing device 2, such as UI module 6. For instance, text prediction module 10 may send a candidate word or words determined from the gesture data to UI module 6 that causes UI device 4 to display the words.

As shown in FIG. 1, GUI 12 may be a user interface generated by UI module 6 that allows a user to interact with computing device 2. GUI 12 may include graphical content. Graphical content, generally, may include text, images, a group of moving images, etc. As shown in FIG. 1, graphical content may include graphical keyboard 14, text entry area 16, and word suggestion area 18. Graphical keyboard 14 may include a plurality of keys, such as the keys illustrated in FIG. 1 representing different letters of the alphabet. In some examples, each of the plurality of keys included in graphical keyboard 14 represents a single character. In other examples, one or more of the plurality of keys included in graphical keyboard 14 represents a group of characters selected based on a plurality of modes.

In some examples, text entry area 16 may include characters or other graphical content that are included in, for example, a text-message, a document, an e-mail message, a web browser, or any other situation where text entry is desired. For instance, text entry area 16 may include characters or other graphical content that are selected by a user via gestures performed at UI device 4. In some examples, word suggestion area 18 may display a candidate word or words determined by prediction module 10 based on gestures data received from UI module 6. UI module 6 may cause UI device 4 to display graphical keyboard 14 and detect a gesture having gesture path 20, based upon which text prediction module 10 can determine one or more candidate words. Additionally, UI module 6 may cause UI device 4 to display a candidate word determined from the gesture in word suggestion areas 24.

Techniques of the present disclosure may improve the speed and accuracy with which a user can enter text into a computing device. Examples according to this disclosure allow a user to enter a word at a computing device by drawing a partial gesture from which the computing device can recognize the word. The example techniques, as described further below, provide the user with a shortcut that is part of the same partial gesture to accept the candidate word recognized by the device.

In one example, UI device 4 of computing device 2 outputs graphical keyboard 14 for display including a number of keys associated with various symbols. As illustrated in FIG. 1, some of the keys of keyboard 14 represent letters by which a user may enter text at UI device 4. UI module 6 of computing device 2 may identify a gesture to select at least two of the keys of graphical keyboard 14 based at least in part on UI device 4 detecting an input unit, e.g. the tip of the user's finger at a number of locations of the presence-sensitive display that forms part of UI device 4. In response to detecting the input unit at the locations of the display and while the input unit is still detected by UI device 4 at the presence-sensitive display, text prediction module 10 may determine a candidate word for the identified gesture based at least in part on the at least two keys and communicate the word or data representing the word to UI module 6, which may then control UI device 4 to output the candidate word for display at a first location of the presence-sensitive display. In response to determining that the input unit is no longer detected at the presence-sensitive display, UI device 4 may output the displayed candidate word for display at a second location of the presence-sensitive display. For instance, in response to determining that gesture has terminated prior to selecting all of the plurality of keys corresponding to a candidate word, UI device 4 may output the displayed candidate word for display at a second location of the presence-sensitive display. In some examples, UI module 6 may determine the gesture while the input unit is within a threshold distance of the presence-sensitive input device, and in response to determining that the input unit is no longer within the threshold distance of the presence-sensitive input device, UI module 6 may determine the gesture has terminated.

With reference to the example illustrated in FIG. 1, a user of computing device 2 inputs a word using graphical keyboard 14 by performing a gesture at UI device 4. The user is employing a fingertip to select keys of graphical keyboard 14. However, in another example according to this disclosure, the user may employ a different input unit such as a stylus device. The user provides continuous swipe gesture along gesture path 20 to select a number of keys of graphical keyboard 14. In the example of FIG. 1, the user's swipe gesture along path 20 travels through f, r, t, y, u, i, and e. UI device 4 detects the user's finger at various locations of the presence-sensitive display and communicates data associated with such detection to UI module 6. UI module 6 in turn may identify the gesture provided by the user based on the data received from UI device 4. In the example of FIG. 1, UI module 6 may determine path 20 traveled by the user's finger and also, alone or in conjunction with keyboard module 8, determine the keys and associated letters through which the gesture provided by the user travels.

As the user is performing the swipe gesture along path 20, UI module 6 is identifying the gesture and the keys selected thereby. In some examples, text prediction module 10 may also be determining one or more candidate words based on the gesture identified by UI module 6. Thus, as the user continues a gesture, e.g., from letter f to letter r and then on through letters t, y, and u to letter I, UI module 6 may continuously or periodically identify the gesture. Text prediction module 10 may also determine one or more candidate words based on the gesture identified by UI module 6 up to that point. Thus, the candidate words determined by text prediction module 10 may change as the swipe gesture provided by the user progresses along gesture path 20.

After the user has swiped through the entire path 20 illustrated in FIG. 1 through the letters f, r, t, y, u, i, and e, text prediction module 10 determines two candidate words, "friend" and "friends," from the gesture identified by UI module 6. Additionally, UI module 6 sends data to UI device 4 that causes UI device 4 to output the candidate words, e.g., based on data received from text prediction module 10, at the display device as part of GUI 12. Both the determination of the candidate words by text prediction module 10 and the display of those words at the display of UI device 4 can occur before the user lifts the finger away from UI device 4 such that UI device 4 no longer detects the presence of the user's finger. In other words, the determination of the candidate words by text prediction module 10 and the display of those words at the display of UI device 4 can occur while UI device 4 still detects the user's finger at the presence-sensitive display.

Text prediction module 10 can employ any of a number of techniques to determine candidate words based on partial gestures identified by UI module 6. In general, the prediction techniques employed by text prediction module 10 may determine candidate words incrementally as the user provides a gesture at UI device 4 such that the user need not complete the gesture for text prediction module 10 to provide one or more candidate words. In some examples, the candidate words may change as text prediction module 10 receives indications of the gesture provided by the user progressing.

In some examples, text prediction module 10 can employ a probabilistic model that predicts candidate words based on various factors including the letters associated with the keys of graphical keyboard 14 selected by the user, as well as prior user inputs and/or the context in which the user is entering the text like other words in a sequence of words entered by the user. As the user provides the partial gesture at the presence-sensitive display of UI device 4, text prediction module 10 can determine a number of candidate words and also determine a relative order for the multiple candidates based on the probability each word is the correct word that the user is attempting to enter. The order of the candidate words determined by text prediction module 10 may affect the manner in which UI module 6 controls UI device 4 to output each word at the display as well as the character of the gesture that is provided by user to cause text prediction module 10 to select a particular candidate word as the correct word. Example techniques that may be employed by text prediction module 10 to determine candidate words based on partial gestures identified by UI module 6 are further described in FIG. 6.

In some examples, text prediction module 10 may determine candidate words based on multiple factors including, e.g., speed of gesture, inflection points in gesture path 20. In this way, text prediction module 10 may determine, based on factors independent of letters selected in the gesture, a confidence metric about whether the user is selecting a letter or just passing through a letter corresponding to a key of keyboard 14 on its way to another letter. Additionally, there may be circumstances in which a gesture provided by a user indicates a complete word and part of an incomplete word. For example, in response to receiving an indication of a gesture that swipes through the letters f-r-e-e, text prediction module 10 may determine that both the words "free" and "freedom" are very highly likelihood candidate words. In such an example, text prediction module 10 may suggest the completely spelled word above the partially spelled.

Referring to the example of FIG. 1, text prediction module 10 has determined two candidate words, "friend" and "friends," based on the gesture identified by UI module 6. In this example, although UI module 6 has determined that the user has swiped through locations at the display of UI device 4 corresponding to the letters f, r, t, y, u, i, and e, text prediction module 10 determines that the user is selecting the letters f-r-i-e. Based upon the identification of the gesture to select the letters f-r-i-e along swipe path 20, text prediction module 10 determines the two candidate words "friend" and "friends."

Text prediction module 10 may communicate data representing the candidate words "friend" and "friends" to UI module 6, which can, in turn, can control UI device 4 to display the words as part of GUI 12. In one example, display of candidate words by UI module 6 may be dependent on the speed at which the user provides the gesture at the presence-sensitive display such that, if speed is above a threshold, UI module 6 may refrain from displaying any candidates until the user slows down because displaying the words may be a distraction in such circumstances. In some examples, UI module 6 may vary the locations at which UI module 6 controls UI device 4 to display the candidate words and may be based on a number of different factors. Additionally, UI module 6 may vary the appearance of the candidate words based on the relative probability determined by text prediction module 10 that each word is the correct word. For example, UI module 6 may display the top candidate word different than or separately from all of the other candidate words determined by text prediction module 10.

In the example of FIG. 1, UI module 6 controls UI device 4 to display the candidate words "friend" in two different locations at the presence-sensitive display of device 4. In this example, text prediction module 10 has determined that "friend" is the top candidate word among the two candidates. UI module 6 controls UI device 4 to output the top candidate word "friend" at a one location 22 that is based at least in part on a location of the user's finger detected by UI device 4. UI module 6 also controls UI device 4 to output the top candidate word "friend" at a second location 24 at word suggestion area 18. Display of "friend" at second location 24 of word suggestion area 18 can be based on a predetermined location that does not depend on circumstances, such as the manner in which the user is interacting with computing device 2 at the time UI device 4 outputs the word for display. In the example of FIG. 1, in both location 22 and location 24, UI module 6 controls UI device 4 to output the top candidate word "friend" for display in an emphasized format relative to the second candidate word "friends." The appearance of the word "friend" at location 22 is in a bold and shadowed font that is larger than the text appearing at word suggestion area 18. The appearance of the word "friend" at location 24 at word suggestion area 18 is in a bold and underlined font.

As noted above, UI module 6 controls UI device 4 to output the top candidate word "friend" at location 22 based at least in part on a location of the user's finger detected by UI device 4. In one example, UI module 6 can control UI device 4 to output the top candidate word "friend" at location 22, which is a threshold distance from the location of the user's finger detected by UI device 4. Additionally, in one example, UI module 6 can control UI device 4 to output the top candidate word "friend" at a number of locations of the presence-sensitive display such that the top candidate word follows the user's finger as it progresses through a gesture, e.g., as it progresses along gesture path 20.

Display of candidate words at particular locations of a display device operatively coupled to a computing device may have certain advantages. For example, displaying a candidate word relative to a location at which a user gesture is detected at a display device may allow the user to more easily continue the gesture while determining whether or not the candidate word suggested by the computing device is the correct word the user would like to enter. In the event the computing device displays the word, e.g., in close proximity to the detected location of the gesture provided by the user, the user does not need to look away from where they are currently providing the gesture to another location, such as a predetermined location like a suggested words area above a graphical keyboard by which the user is inputting the word. For example, as described above, UI module 6 can control UI device 4 to output the top candidate word "friend" at location 22, which is a threshold distance from the location of the user's finger detected by UI device 4. The threshold distance may be selected to be close enough to the location of the user's finger detected by UI device 4 that viewing the candidate word at that location will reduce the chance that the user will need to look away from where they are currently providing the gesture to another location.

Referring again to the example of FIG. 1, UI module 6 can control UI device 4 to output the top candidate word "friend" at location 22 based on the detected location of the user's finger in a manner that reduces the degree to which the candidate word obstructs view of graphical keyboard 14. For example, UI module 6 can control UI device 4 to output the top candidate word "friend" at location 22 as partially transparent such that the keys of graphical keyboard 14 under the candidate word are partially visible.

As noted above, the foregoing functions and features related to text prediction module 10 of computing device 2 determining one or more candidate words based on an identified gesture provided by the user, and UI module 6 controlling UI device 4 to output the candidate words for display, may occur in response to UI device 4 detecting the user's finger at the locations to select keys of graphical keyboard 14. Such determination may occur while the finger is still detected by UI device 4 at the presence-sensitive display. In other words, as the user is executing the swipe gesture along path 20, UI module 6 can be identifying the gesture and the keys selected thereby. As the user is executing the swipe gesture, text prediction module 10 can also be determining one or more candidate words based on the gesture identified by UI module 6. Furthermore, as the user is executing the swipe gesture, UI module 6 can be controlling UI device 4 to display one or more of the candidate words determined by text prediction module 10.

In some examples, if the user determines that one of the candidate words determined by text prediction module 10 is the correct word, the user may quickly and easily indicate the correct word without necessarily selecting the word, e.g., without lifting the finger of the user away from UI device 4 and then providing an additional gesture at the presence-sensitive display of UI device 4 to select one of the candidate words. In examples according to this disclosure, the user may indicate the top candidate word "friend" in the example of FIG. 1 is the correct word, e.g., select the top candidate word, by simply lifting the user's finger away from UI device 4 such that device 4 no longer detects the presence of the finger. In this case, after UI device 4 no longer detects the finger of the user at the presence-sensitive display (e.g., when the user lifts the finger, or other input unit away from the device after reaching the end of gesture path 20 in FIG. 1 at a location corresponding to the "e" key of graphical keyboard 14) UI module 6 may automatically control UI device 4 to display the top candidate word "friend" in text entry area 16, as illustrated in FIG. 1. Thus, in the example of FIG. 1, the user can enter the word "friend" using partial gesture graphical keyboard 14 by providing a partial gesture swiping through the letters f-r-i-e along path 20 and then simply lifting the user's finger up and away from the presence-sensitive display of UI device 4. In this way, the user may perform a gesture select fewer than all of the plurality of keys corresponding to the word "friend," and in response to determining the user's finger has lifted up and away from UI device 4 (e.g., the gesture has terminated prior to selecting all of the plurality of keys corresponding to "friend"), UI device 6 may cause UI device 4 to output the candidate word for display in text entry area 16 of GUI 12.

In some cases, the user may wish to enter one of the candidate words other than the top candidate based on a partial gesture. For example, the user may wish to enter "friends" instead of "friend" after swiping through the letters f-r-i-e along path 20. In such a case, UI module 6 may identify another gesture to select a second candidate word over the top candidate word. In one example, UI device 6 can then, in response to identifying the other gesture and determining that the user's finger is no longer detected at the presence-sensitive display of UI device 4, output the second candidate word "friends" for display at text entry area 16.

Figure 2:
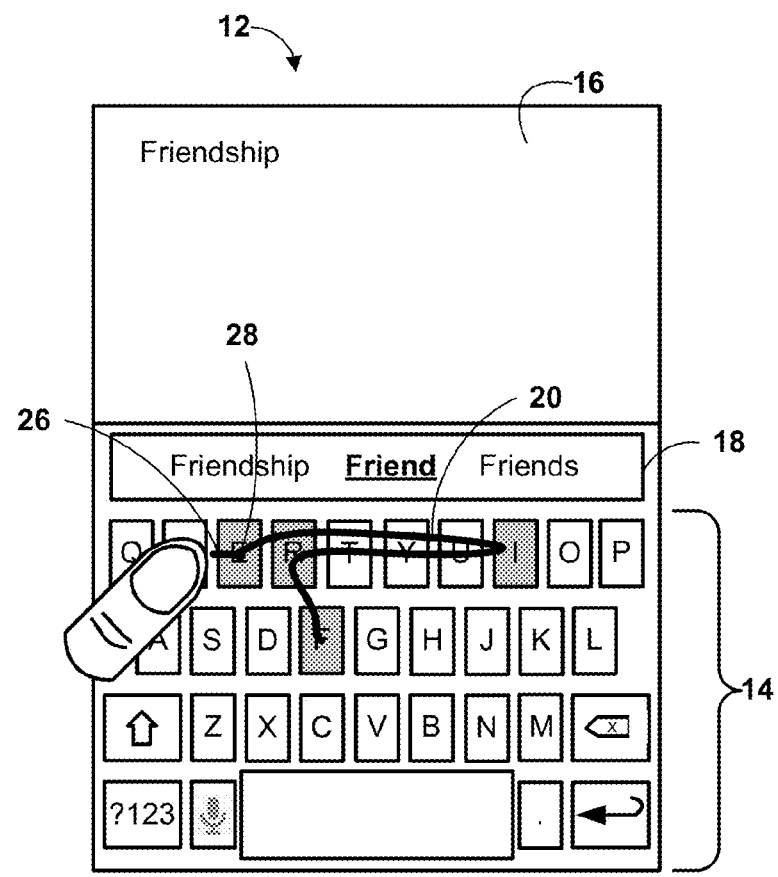
FIGS. 2-4 are block diagrams of a graphical user interface output for display by the computing device of FIG. 1 illustrating examples in which a computing device uses a partial gesture to select one of a number of candidate words.
Figure 3:
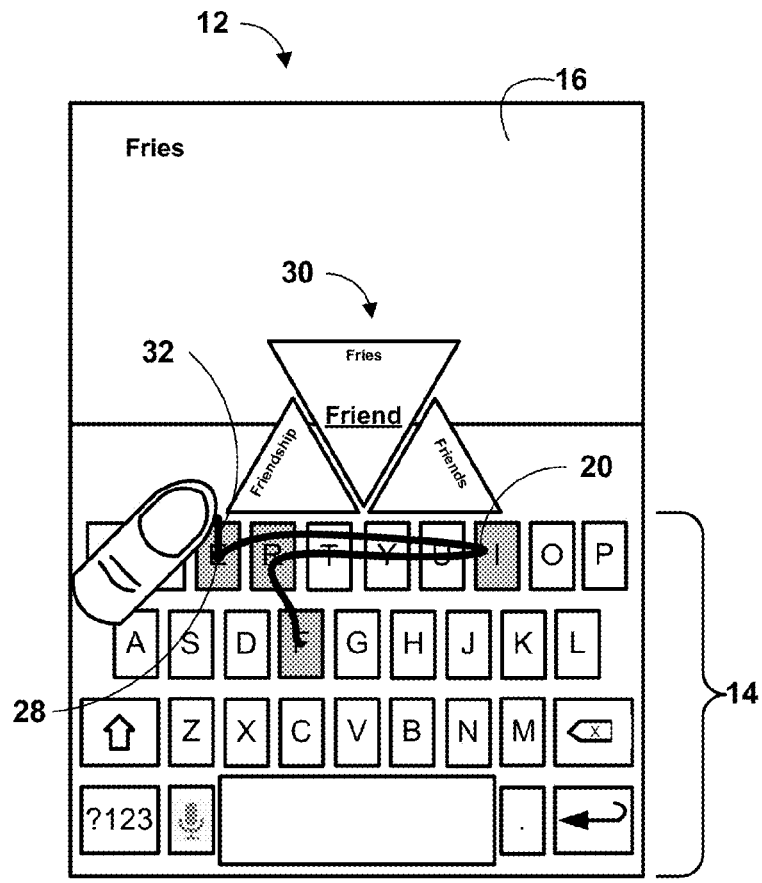
Figure 4:
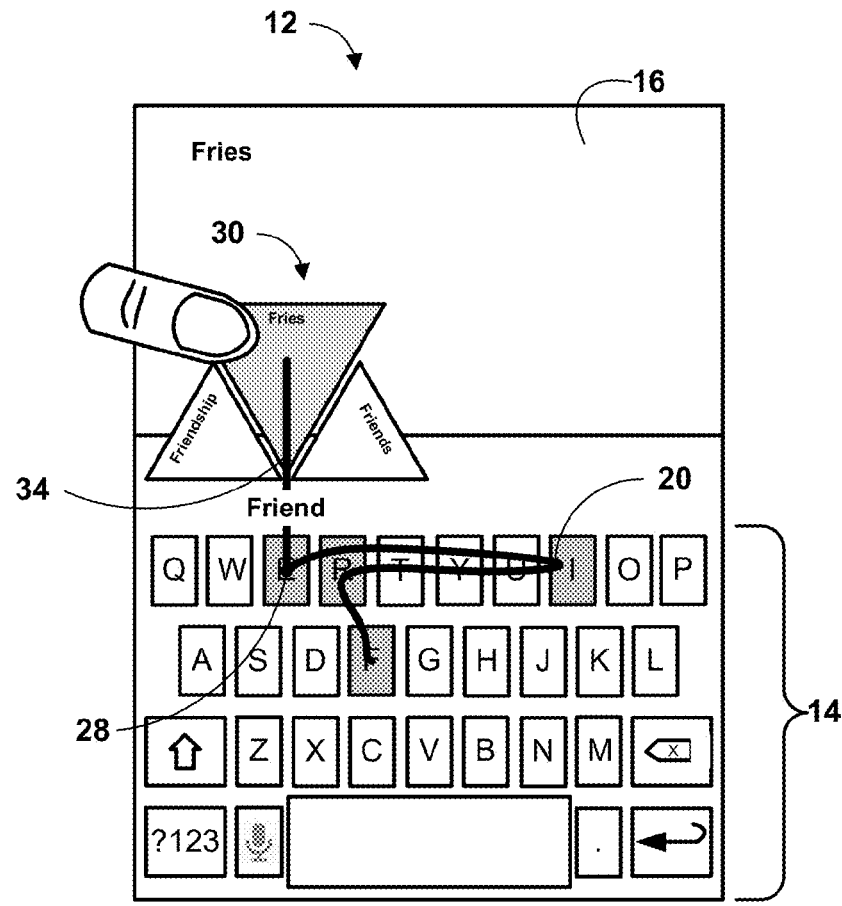

FIGS. 2-4 are block diagrams of GUI 12 illustrating examples in which a computing device selects, in response to receiving an indication of a partial gesture, one of a number of determined candidate words other than a top candidate. In general, UI module 6 of computing device 2 may identify a gesture as part of or following the initial partial swipe gesture. UI module 6 may identify the gesture based on UI device 4 detecting the user's finger (or another input unit) at one or more locations of UI device 4. The locations may be in a direction that is in the same direction of the one of the candidate words displayed at UI device 4 relative to the top candidate word. For example, a user may wish to select a candidate word that is displayed in suggested words area 18 to the left of the top candidate word. UI module 6 may identify a gesture as part of or following the initial partial swipe gesture. UI module may perform the identification based on UI device 4 detecting movement of the user's finger (or another input unit) at one or more locations in a rightward direction. The movement may originate from the location of the finger when text prediction module 10 determined and UI module 6 controlled UI device 4 to display the candidate words.

An example of the foregoing use case is illustrated in FIG. 2. In FIG. 2, the user performs a partial gesture to select keys of graphical keyboard 14 corresponding to the letters f-r-i-e by swiping along swipe path 20 in a similar manner as illustrated in FIG. 1. At or before UI device 4 detects the user's finger at the end of swipe path 20 corresponding to a location at the presence-sensitive display near the "e" key of graphical keyboard 14, text prediction module 10 determines three candidate words based on the swipe gesture including "friend," "friends," and "friendship." In this example as in the example of FIG. 1, text prediction module 10 determines that "friend" is the top candidate for the correct word based on the partial gesture provided by the user. Additionally, at or before UI device 4 detects the user's finger at the end of swipe path 20 corresponding to a location at the presence-sensitive display near the "e" key of graphical keyboard 14, UI module 6 controls UI device 4 to output the candidate words for display in suggested words area 18 such that "friendship" appears to the left of "friend" and "friends" appears to the right. In the example of FIG. 2, the user can enter the top candidate word "friend" by simply lifting the user's finger up and away from the presence-sensitive display of UI device 4 such that UI device 4 no longer detects the presence of the finger.

In the event the user would like to enter "friendship" rather than the top candidate "friend," the user can provide another gesture as part of or after the swipe gesture along path 20. In the example of FIG. 2, the user can provide a short swipe gesture 26 at end 28 of swipe path 20. Gesture 26 can include a relatively short continuous swipe gesture in a direction from end 28 of swipe path 20 that is the same as the direction of "friendship" from the top candidate word "friend," which, in the example of FIG. 2, is to the left. In one example, UI module 6 may identify gesture 26 as a separate gesture from the swipe gesture along path 20 based on the length of the gesture. The length of gesture 26 can be long enough that UI device 4 can detect the movement of the finger and UI module 6 can determine the direction of movement from end 28 of swipe path 20, while also being short enough that the user's finger does not reach a location of the presence-sensitive display corresponding to another key of graphical keyboard 14. In response to UI module 6 identifying gesture 26 and determining that UI device 4 no longer detects the presence of the user's finger, UI device 6 can output the candidate word "friendship" for display at text entry area 16, as illustrated in FIG. 2.

In another example, computing device 2 may select the candidate word "friends" in response to receiving an indication of a short swipe gesture to the right of end 28 of swipe path 20 and then lifting the user's finger up and away from the presence-sensitive display. Additionally, in one example, computing device 2 may select a second candidate word other than a first top candidate in response to receiving an indication of a short swipe gesture in one direction from end 28 of swipe path 20 and then lifting the user's finger up and away from the presence-sensitive display. Computing device 2 may select a third candidate word other than the top candidate in response to a receiving an indication of a gesture swiping slightly more in the same direction from end 28.

FIGS. 3 and 4 are block diagrams of GUI 12 illustrating additional examples in which a computing device selects, in response to receiving an indication of a partial gesture, one of a number of determined candidate words other than a top candidate. In the example of FIGS. 3 and 4, UI module 6 controls UI device 4 to output the candidate words as part of a pie menu structure displayed as part of GUI 12. Additionally, the example of FIGS. 3 and 4 contemplate situations in which text prediction module 10 determines more than three candidate words including one top candidate.

In the example of FIG. 3, computing device 2 may receive an indication of a partial gesture to select keys of graphical keyboard 14 corresponding to the letters f-r-i-e by swiping along swipe path 20 in a similar manner as illustrated in FIG. 1. At or before UI device 4 detects, e.g., the user's finger at the end of swipe path 20 corresponding to a location at the presence-sensitive display near the "e" key of graphical keyboard 14, text prediction module 10 determines four candidate words based on the swipe gesture including "friend," "friends," "friendship," and "fries." In FIG. 3, text prediction module 10 again determines that "friend" is the top candidate for the correct word based on the partial gesture provided by the user. At or before UI device 4 detects the user's finger at the end of swipe path 20 corresponding to a location at the presence-sensitive display near the "e" key of graphical keyboard 14, UI module 6 controls UI device 4 to output the candidate words for display in pie menu 30 such that "friendship" appears to the left of "friend," "friends" appears to the right of "friend," and "fries" appears above "friend."

In the event the user would like to enter "fries," for example, rather than the top candidate "friend," the user can provide another gesture as part of or after the swipe gesture along path 20. In the example of FIG. 3, computing device 2 may receive an indication of a short swipe gesture 32 at end 28 of swipe path 20. Gesture 32 can include a relatively short continuous swipe gesture in a direction from end 28 of swipe path 20 that is the same as the direction of "fries" from the top candidate word "friend," which, in the example of FIG. 2, is up. In response to UI module 6 identifying gesture 32 and determining that UI device 4 no longer detects the presence of the user's finger, UI device 6 can output the candidate word "fries" for display at text entry area 16, as illustrated in FIG. 3. In another example, computing device 2 may select the candidate word "friends" in response to receiving an indication of a short swipe gesture to the left of end 28 of swipe path 20 and then determining a lifting of the user's finger up and away from the presence-sensitive display. In another example, computing device may select the candidate word "friends" in response to receiving an indication of a short swipe gesture to the right of end 28 of swipe path 20 and then determining a lifting the user's finger up and away from the presence-sensitive display.

The example of FIG. 4 includes another example in which UI module 6 controls UI device 4 to output four candidate words including "friend," "friends," "friendship," and "fries" as part of pie menu 30 displayed as part of GUI 12. In the example of FIG. 4, however, UI module 6 controls UI device 4 to output pie menu 30 at a location that is based at least in part on the location of the user's finger detected by UI device 4 at end 28 of swipe path 20. In such a case, it may be convenient and efficient for the user to provide a gesture that is different than the short swipe gestures described above with reference the examples of FIGS. 2 and 3. Computing device 2, may, for example, receive an indication to add to end 28 of the swipe gesture along path 20 an additional swipe to a location of the presence-sensitive display corresponding to the location at which the candidate word the user would like to enter is displayed. In the example of FIG. 4, computing device 2 may receiving an indication of an upward swipe gesture 34 from end 28 of swipe path 20 to enter the candidate word "fries."

The example of FIG. 4 may not be employed in all use cases. For example, outputting pie menu 30 at a location that is based at least in part on the location of the user's finger detected by UI device 4 at end 28 of swipe path 20 may, in some cases, cause pie menu 30 to obstruct the view of substantial portions of graphical keyboard 14. However, the technique could be employed without obstructing graphical keyboard 14 in examples where, for example, the end of a partial swipe gesture provided by the user is at a location of the presence-sensitive display of UI device 4 corresponding to keys of graphical keyboard 14 in the top row (e.g., keys corresponding to the letters q, w, e, r, t, y, u, i, o, p in the example of FIG. 4) of keyboard 14.

The examples of FIGS. 2-4 provide graphical presentations of a computing device outputting candidate words at a display device operatively coupled to the computing device. These examples are illustrative only and examples according to this disclosure may include other graphical presentations of the candidate words. For example, UI module 6 can control UI device 4 to output for display a number of candidate words in an ordered or unordered list somewhere above graphical keyboard 14. In such an example, the user may enter a candidate word other than the top candidate by providing a gesture, e.g. a tap gesture to select one of the words from the list after providing a partial swipe gesture based on which text prediction module 10 determines the candidates output for display in the list.

Figure 5:
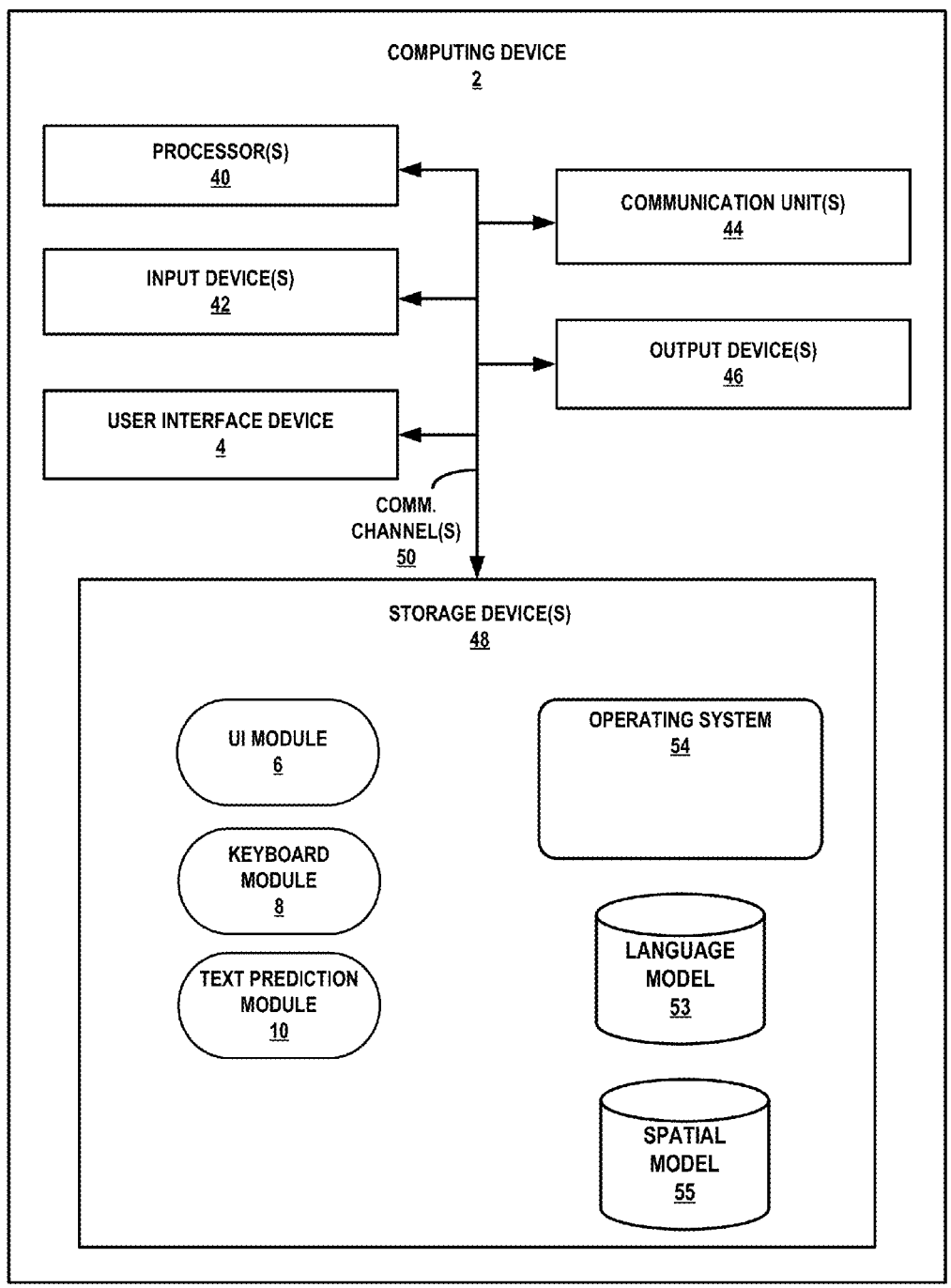
FIG. 5 is a block diagram illustrating further details of one example of the computing device as shown in FIG. 1.

FIG. 5 is a block diagram illustrating further details of one example of a computing device shown in FIG. 1, in accordance with one or more techniques of the present disclosure. FIG. 5 illustrates only one example of computing device 2 as shown in FIG. 1, and many other examples of computing device 2 may be used in other instances.

As shown in the example of FIG. 5, computing device 2 includes one or more processors 40, one or more input devices 42, one or more communication units 44, one or more output devices 46, one or more storage devices 48, and UI device 4. Computing device 2, in one example further includes UI module 6, keyboard module 8, text prediction module 10, and operating system 54 that are executable by computing device 2. Each of components 4, 40, 42, 44, 46, and 48 (physically, communicatively, and/or operatively) for inter-component communications. In some examples, communication channels 50 may include a system bus, a network connection, an inter-process communication data structure, or any other method for communicating data. As one example in FIG. 5, components 4, 40, 42, 44, 46, and 48 may be coupled by one or more communication channels 50. UI module 6, keyboard module 8, and text prediction module 10 may also communicate information with one another as well as with other components in computing device 2.

Processors 40, in one example, are configured to implement functionality and/or process instructions for execution within computing device 2. For example, processors 40 may be capable of processing instructions stored in storage device 48. Examples of processors 40 may include, any one or more of a microprocessor, a controller, a digital signal processor (DSP), an application specific integrated circuit (ASIC), a field-programmable gate array (FPGA), or equivalent discrete or integrated logic circuitry.

One or more storage devices 48 may be configured to store information within computing device 2 during operation. Storage device 48, in some examples, is described as a computer-readable storage medium. In some examples, storage device 48 is a temporary memory, meaning that a primary purpose of storage device 48 is not long-term storage. Storage device 48, in some examples, is described as a volatile memory, meaning that storage device 48 does not maintain stored contents when the computer is turned off. Examples of volatile memories include random access memories (RAM), dynamic random access memories (DRAM), static random access memories (SRAM), and other forms of volatile memories known in the art. In some examples, storage device 48 is used to store program instructions for execution by processors 40. Storage device 48, in one example, is used by software or applications running on computing device 2 (e.g., text prediction module 10) to temporarily store information during program execution.

Storage devices 48, in some examples, also include one or more computer-readable storage media. Storage devices 48 may be configured to store larger amounts of information than volatile memory. Storage devices 48 may further be configured for long-term storage of information. In some examples, storage devices 48 include non-volatile storage elements. Examples of such non-volatile storage elements include magnetic hard discs, optical discs, floppy discs, flash memories, or forms of electrically programmable memories (EPROM) or electrically erasable and programmable (EEPROM) memories.

The examples of FIGS. 1-5 are described with reference to functions being carried out by a number of modules, e.g., UI module 6, keyboard module 8, and text prediction module 10. However, in other examples according to this device, the functions attributed to such specific modules may be implemented in more, fewer, and/or different modules. Additionally, in some examples, the functions may not be distributed between physical or logical modules, but, instead, may be executed by, e.g., processors 40 based on instructions and data stored on storage devices 48. Additionally, although UI module 6, keyboard module 8, and text prediction module 10 are illustrated as part of storage devices 46 in the example of FIG. 5, in other examples, UI module 6, keyboard module 8, and text prediction module 10 may be implemented separate from storage devices 46, including, e.g., implemented in discrete hardware components configured to carry out the functions attributed to the modules in the examples disclosed herein.

Computing device 2, in some examples, also includes one or more communication units 44. Computing device 2, in one example, utilizes communication unit 44 to communicate with external devices via one or more networks, such as one or more wireless networks. Communication unit 44 may be a network interface card, such as an Ethernet card, an optical transceiver, a radio frequency transceiver, or any other type of device that can send and receive information. Other examples of such network interfaces may include Bluetooth, 3G and WiFi radios computing devices as well as Universal Serial Bus (USB). In some examples, computing device 2 utilizes communication unit 44 to wirelessly communicate with an external device such as a server.

Computing device 2, in one example, also includes one or more input devices 42. Input device 42, in some examples, is configured to receive input from a user through tactile, audio, or video feedback. Examples of input device 42 include a presence-sensitive display, a mouse, a keyboard, a voice responsive system, video camera, microphone or any other type of device for detecting a command from a user. In some examples, a presence-sensitive display includes a touch-sensitive screen.

One or more output devices 46 may also be included in computing device 2. Output device 46, in some examples, is configured to provide output to a user using tactile, audio, or video stimuli. Output device 46, in one example, includes a presence-sensitive display, a sound card, a video graphics adapter card, or any other type of device for converting a signal into an appropriate form understandable to humans or machines. Additional examples of output device 46 include a speaker, a cathode ray tube (CRT) monitor, a liquid crystal display (LCD), or any other type of device that can generate intelligible output to a user. In some examples, UI device 4 may include functionality of input device 42 and/or output device 46. In the example of FIG. 5, UI device 4 may be a touch-sensitive screen.

In one example, output devices 46 include a speaker configured to provide audible output to a user in conjunction with one or more aspects of examples according to this disclosure. For example, in response to detecting the presence of an input unit by UI device 4 and while the input unit is detected at, e.g., a presence-sensitive display, a speaker included in output devices 46 may audibly output the candidate word(s) determined by text prediction module 10 based on a partial gesture identified by UI module 6.

Computing device 2 may include operating system 54. Operating system 54, in some examples, controls the operation of components of computing device 2. For example, operating system 54, in one example, facilitates the communication of UI module 6, keyboard module 8, and/or text prediction module 10 with processors 40, communication unit 44, storage device 48, input device 42, and output device 46. UI module 6, keyboard module 8, and text prediction module 10 may each include program instructions and/or data that are executable by computing device 2. As one example, UI module 6 may include instructions that cause computing device 2 to perform one or more of the operations and actions described in the present disclosure.

Computing device 2 can include additional components that, for clarity, are not shown in FIG. 5. For example, computing device 2 can include a battery to provide power to the components of computing device 2. Similarly, the components of computing device 2 shown in FIG. 5 may not be necessary in every example of computing device 2. For example, in some configurations, computing device 2 may not include communication unit 44.

Generally, gesture keyboards may differ from other graphical keyboards by allowing a user to perform a single continuous gesture that indicates all the characters of a word, rather than requiring the user to perform a discrete gesture for each character of the word. Responsive to detecting this gesture, computing device 2 may determine a sequence of keys on the keyboard corresponding to a path traced by the gesture. For example, a user could enter the word "friend" using a single gesture that traces a path traversing, in sequence, the "f," "r," "i," "e," "n," and "d" keys output at a presence-sensitive display, such as UI device 4, of computing device 1. Computing device 2 may be configured to initiate word recognition techniques upon completion of the gesture (i.e., after a user finger or other input unit is lifted up and away from the presence-sensitive display).

Computing device 2 may be configured to start word recognition prior to the completion of the gesture. For example, computing device 2 may predict the word conference after detecting a gesture traversing along a path that includes only four letters, (i.e., "c," "o," "n," and "f") of the ten letters of conference. Computing device 2 may, in some implementations, output a predicted word or words for selection (i.e., confirmation) by the user. For the user to select the desired word, the user to perform an additional gesture at a different location of the virtual keyboard that displays the predicted word.

In some examples, computing device 2 may output for display a "top" candidate word (e.g. the word that is determined to have the highest probability of being the word the user would like to enter) or may display multiple word candidate words at a display device. In examples where multiple words are displayed, techniques of this disclosure enable the user to select one of the candidates other than the top candidate based on the direction or other characteristic of the gesture performed after the candidate words are displayed through termination of the gesture. For example, the top candidate in the foregoing example in which the user has swiped through f-r-i-e may befriend, and the second candidate may befriends. The user can, in accordance with the disclosed examples, select the word "friends" by, after the candidate words are displayed, moving the input unit slightly to the right and lifting it up and away from the presence-sensitive display of the computing device.

Computing device 2 may output the recognition results for display in a word suggestion bar portion of a graphical user interface (GUI) after the gesture is completed. Typically, the word suggestion bar is located above the graphical keyboard within a GUI and separated from the location of the input unit. Rather than requiring a user to switch attention from the input unit position to the top of the keyboard to check the recognition results, which can be inefficient for users and make such gesture keyboards prone to errors, computing device 2 may output the recognition result, e.g., the candidate word(s), for display directly above the detected location of the input unit (or at another position relative to the detected location of the input unit). In one example, as the detected location of the input unit changes, computing device 2 updates the location at which the recognition result is displayed such that recognition result appears to move along with the movement of the input unit. Displaying the recognition result at or near the location of the input unit may allow the user to better keep track of the recognition result without switching focus.

The disclosed examples may provide a number of features and advantages. For example, graphical keyboards, according to this disclosure, allow partial gesture recognition by which a computing device can output a predictive text recognition result and complete entry of a word or other text without requiring the user to perform a gesture that travels along a path that includes all of the letters of the word. Partial gesture word recognition and selecting techniques of this disclosure can save time and make text entry on mobile computing devices more efficient, accurate, and enjoyable. Additionally, the recognition results, e.g., the candidate words recognized by the device from the partial gesture, can be displayed adjacent the input unit by which the partial gesture is received at the presence-sensitive display of the computing device. For example, the recognition results can be displayed just above the fingertip by which the user is entering text at the presence-sensitive display of the computing device. In such examples, users may not need to switch interaction focus to check the recognition results, which can make the text entry process more efficient and less prone to errors.

In accordance with the techniques of this disclosure, example computing device 2 of FIG. 5 may allow a user to enter a word by drawing a partial gesture from which computing device 2 can determine the word and provide the user a shortcut that is part of the same partial gesture to accept the candidate word recognized by the device. In one example, UI device 4 of computing device 2 may output a graphical keyboard including a number of keys associated with various symbols. Some of the keys of the graphical keyboard output by UI device 4 can represent letters by which a user may enter text at UI device 4. UI module 6 of computing device 2 may identify a gesture from a user to select at least two of the keys of the graphical keyboard based at least in part on UI device 4 detecting an input unit, e.g. the tip of the user's finger at a number of locations of a presence-sensitive display that forms part of UI device 4. In response to detecting the input unit at the locations of the display and while the input unit is still detected by UI device 4 at the presence-sensitive display, text prediction module 10 can determining a candidate word for the identified gesture based at least in part on the at least two keys and communicate the word or data representing the word to UI module 6, which may then control UI device 4 to output the candidate word for display at a first location of the presence-sensitive display. In response to determining that the input unit is no longer detected at the presence-sensitive display, UI device 4 can output the displayed candidate word for display at a second location of the presence-sensitive display.

In the foregoing manner, a user can enter a word at computing device 2 using a partial swipe gesture with the user's finger or another input unit to select keys of a graphical keyboard corresponding to some, but not all of the letters of the word and then lift the user's finger up and away from the presence-sensitive display of UI device 4. Additionally, a user can employ a partial gesture to enter one of a number of determined candidate words other than a top candidate at example computing device 2 of FIG. 5 in similar manner as described above with reference to the examples of FIGS. 2-4.

Computing device 2, in some examples, includes language model 53. Language model 53 may include a lexicon. In some examples, a lexicon may include a listing of words and may include additional information about the listed words. A lexicon may be represented by a range of data structures, such as an array, a list, and/or a tree. For example, language model 53 may include a lexicon stored in a trie data structure. A lexicon trie data structure may contain a plurality of nodes, each node may represent a letter. The first node in a lexicon trie may be called the entry node which may not correspond to a letter. In other examples, the entry node may correspond to a letter. Each node may have one or more child nodes. For instance, the entry node may have twenty-six child nodes, each corresponding to a letter of the English alphabet.

A subset of the nodes in a lexicon trie may each include a flag which indicates that the node is a terminal node. Each terminal node of a lexicon trie may indicate a complete word (e.g., a candidate word). The letters indicated by the nodes along a path of nodes from the entry node to a terminal node may spell out a word indicated by the terminal node. In some examples, language model 53 may be a default dictionary installed on computing device 2. In other examples, language model 53 may include multiple sources of lexicons, which may be stored at computing device 2 or stored at one or more remote computing devices and are accessible to computing device 2 via one or more communication channels.

In some examples, language model 53 may be implemented in the firmware of computing device 2. Language model 53 may include language model frequency information such as n-gram language models. An n-gram language model may provide a probability distribution for an item $x_i$ (letter or word) in a contiguous sequence of items based on the previous items in the sequence (i.e., $P(x_i|x_{i-(n-1)}, \ldots, x_{i-1})$). For instance, a bigram language model (an n-gram model where n=2), may provide a probability that the letter "i" follows the sequence "fr". In some examples, language model 53 includes a lexicon tie with integrated language model frequency information. For instance, each node of the lexicon trie may include a representation of a letter and a probability value.

As the user performs the gesture, text prediction module 10 may incrementally determine the word indicated by the gesture. In one example, module 6 may cause UI device 4 to display a GUI. A user may desire to enter text, for example the word "friend" into a text entry area of the GUI. The user, in accordance with the techniques of this disclosure may perform a gesture at a graphical keyboard that is output for display by computing device 2. In one example, the gesture may be a continuous motion in which the user's finger moves into proximity with UI device 4 such that the gesture performed by the finger is detected by UI device 4 throughout the performance of the gesture. In a different example, the user may, move his/her finger into proximity with UI device 4 such that the finger is temporarily detected by UI device 4 and then the user's finger moves away from UI device 4 such that the finger is no longer detected. The gesture may include a plurality of portions. In some examples, the gesture may be divided into portions with substantially equivalent time durations. Where the gesture includes a plurality of portions, the gesture may include a final portion which may be portion of the gesture detected prior to detecting that the gesture is complete. For instance, a portion of the gesture may be designated as the final portion where the user moves his/her finger out of proximity with UI device 4 such that the finger is no longer detected.

While the user performs the gesture to select a group of keys of the plurality of keys, UI module 6 may detect a gesture having a gesture path at the presence-sensitive display. The user may perform the gesture by tracing the gesture path through or near keys of the graphical keyboard that correspond to the characters of the desired word (i.e., the characters represented by an "F" key, "R" key, and "I" key). UI module 6 may send data that indicates the gesture path to text prediction module 10. In some examples, UI module 6 incrementally sends data indicating the gesture path to text prediction module 10 as the gesture path is detected by UI device 4 and received by UI module 6. For instance, UI module 6 may send a stream of coordinate pairs indicating the gesture path to text prediction module 10 as the gesture path is detected by UI device 4 and received by UI module 6.

In response to receiving data that represents the gesture path from UI module 6, text prediction module 10 may determine a candidate word. A candidate word may be a word suggested to the user that is composed of a group of character corresponding to keys indicated by the gesture path. The group of keys may be determined based on the gesture path and a lexicon. Text prediction module 10 may determine a candidate word by determining a group of alignment points traversed by the gesture path, determining respective cost values for each of at least two keys of the plurality of keys, and comparing the respective cost values for at least each of at least two keys of the plurality of keys, as further described below.

An alignment point is a point along the gesture path may indicate a key of the plurality of keys. An alignment point may include one or more coordinates corresponding to the determined position of the alignment point. For instance, an alignment point may include Cartesian coordinates corresponding to a point in the graphical user interface output by computing device 2.

In some examples, text prediction module 10 determines the group of alignment points traversed by the gesture path based on a plurality of features associated with the gesture path. The plurality of features associated with the gesture path may include a length of a segment of the gesture path. For instance, text prediction module 10 may determine the length along the gesture segment from a previous alignment point and the current alignment point. For better alignments, the length will more closely approximate the straight-line distance between to two corresponding keyboard letters.

In another example, text prediction module 10 may determine a direction of a segment from a first point to a second point of the gesture path to determine the group of alignment points. For better alignments, the direction of the segment will more closely approximate the direction of a straight line from between two corresponding keyboard letters.

In some examples, text prediction module 10 may determine respective cost values for each of at least two keys of the plurality of keys included in the graphical keyboard. Each of the respective cost values may represent a probability that an alignment point indicates a key. In some examples, the respective cost values may be based on physical features of the gesture path, the alignment point, and/or the key. For instance, the respective cost values may be based on the physical location of the alignment point with reference to the physical location of the key.

Text prediction module 10 may use one or more spatial models, e.g., spatial model 55, to select a candidate word. Text prediction module 10 may use spatial model 55 to determine one or more probabilities that a particular key of the graphical keyboard has been selected by the user based on alignment points. In some examples, spatial model 55 includes a bivariate Gaussian model for a particular key. The bivariate Gaussian model for a key may include a distribution of coordinates (e.g., (x,y) coordinate pairs) that correspond to locations of UI device 4 that display the given key. More specifically, in some examples, a bivariate Gaussian model for a key may include a distribution of coordinates that correspond to locations of UI device 4 that are most frequently selected by a user when the user intends to select the given key.

In some examples, the respective cost values may be based on language model 53. For instance, the respective cost values may be based on the probability that a second key will be selected after a first key (e.g., the probability that the "r" key will be selected after the "f" key). In some examples, the keys for which respective cost values are determined are selected based at least in part on language model 53. In some examples, the cost values are lower where there is a greater likelihood that an alignment point indicates a key. In other examples, the cost values are higher where there is a greater likelihood that an alignment point indicates a key.

In the example of FIG. 1, text prediction module 10 may determine a first cost value representing a probability that the first alignment point indicates an "F" key and a second cost value representing a probability that the first alignment point indicates a "G" key (e.g., also in proximity to the gesture path that may traverse a portion of the "F" key). Similarly, text prediction module 10 may determine a third cost value representing a probability that the second alignment point indicates an "R" key and a third cost value representing a probability that the second alignment point indicates a "T" key (e.g., also in proximity to the gesture path that may traverse a portion of the "T" key). Lastly, text prediction module 10 may determine a fifth cost value representing a probability that the third alignment point indicates an "I" key and a sixth cost value representing a probability that the third alignment point indicates a "U" key (e.g., also in proximity to the gesture path that may traverse a portion of the "I" key).

Text prediction module 10 may compare the respective cost values for at least two keys of the plurality of keys to determine a combination of keys having a combined cost value. A combined cost value may represent a probability that the gesture path indicates a combination of keys. Text prediction module 10 may compare the respective cost values for at least two keys of the plurality of keys to determine which of the at least two keys is indicated by an alignment point. Text prediction module 10 may determine a combination of keys by determining which keys are indicated by each alignment point. In some examples, text prediction module 10 determines which of the at least two keys is indicated by an alignment point without regard to which keys are indicated by other alignment points. In other examples, text prediction module 10 determines which of the at least two keys is indicated by the alignment point based on which keys are indicated by other alignment points. In such examples, text prediction module 10 may revise the determination of which key is indicated by a previous alignment point based on the respective cost values for a current alignment point.

In some examples, text prediction module 10 may compare the combined cost value a determined combination of keys with a threshold value. In some examples, the threshold value is the combined cost value of a different determined combination of keys. For instance, text prediction module 10 may determine a first combination of keys having a first combined cost value and a second combination of keys having a second combined cost value. In such an instance, text prediction module 10 may determine that the candidate word is based on the combination of keys with the lower combined cost value. In the example of FIG. 5, text prediction module 10 may compare the determined respective cost values (i.e., first, second, third, fourth, fifth, and sixth) to determine a combination of keys (i.e., "F", "R", and "I") having a combined cost value.

In some examples, text prediction module 10 begins to determine a candidate word prior to the time in which UI device 4 completes detecting the gesture path. Rather than determining the candidate word after UI device 4 completes detecting the gesture path, text prediction module 10 may determine a plurality of words as the gesture path is detected, such as "fries", "friend", and "friendship". Text prediction module 10 may contemporaneously revise the determined plurality of words as the gesture path is detected, such as revision "fries" to "friend". Furthermore, rather than determining the candidate word based on a geometric shape of the gesture, techniques of the disclosure may determine a candidate word based on a group of characters indicated by the gesture. Text prediction module 10 may send the determined word to UI module 6 which may then cause UI device 4 to display the word "now" in text entry area 14 of GUI 12. Additional details of other suitable example techniques for partial gesture word prediction are described in U.S. application Ser. No. 13/734,810, entitled "INCREMENTAL FEATURE-BASED GESTURE-KEYBOARD DECODING," which was filed on Jan. 4, 2013 and the entire contents of which are incorporated herein by reference.

In accordance with techniques of the disclosure, text prediction module 10 may receive an indication of a gesture to select the keys corresponding to the characters "frie." For instance, the user may wish to input the word "friend" and therefore begin performing a continuous swipe gesture to select the keys corresponding to the characters "frie." Text prediction module 10, using the techniques described above may determine a group of candidate words including "fries," "friend," and "friendship," which may be output for display. When the gesture has traversed the keys corresponding to the characters "frie," the candidate word "friend" may be associated with a lowest combined cost value among combined cost values that are respectively associated with each of the three candidate words. Computing device 2 may therefore output "friend" for display in proximity to the location of UI device 4 that detects the current location of the user's finger. The user, seeing that the desired word is indicated as the highest-probability candidate because it is displayed in proximity to the current location of the user's finger, may remove user's finger from detection at UI device 4 to select the word. In response to determining that the user has terminated the gesture by removing the user's finger from detection at UI device 4, text prediction module 10 may select "friend" as inputted the inputted word.

Figure 6:
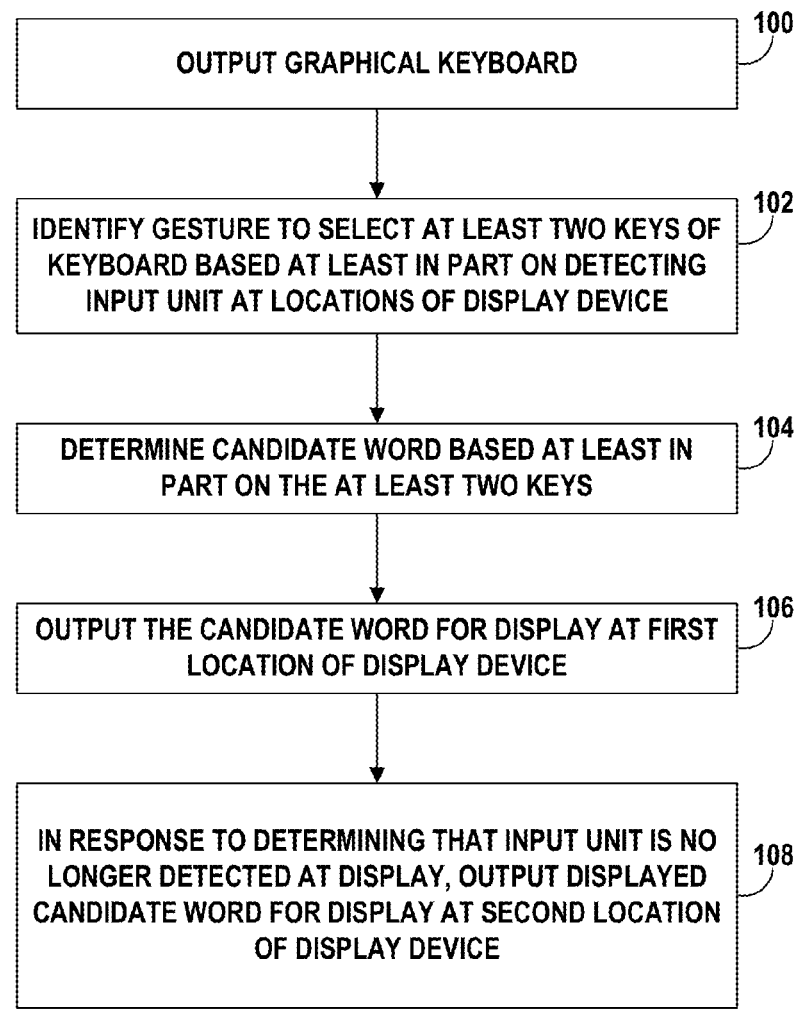
FIG. 6 is a flowchart illustrating an example process of a computing device for selecting a word based on a partial gesture performed at a graphical keyboard.

FIG. 6 is a flowchart illustrating an example process for entering a word at a computing device outputting a graphical keyboard employing a partial gesture. The example process of FIG. 6 includes outputting, for display at a presence-sensitive display operatively coupled to a computing device, a graphical keyboard comprising a plurality of keys (100), identifying, by the computing device, a gesture to select at least two of the plurality of keys based at least in part on detecting an input unit at a plurality of locations of the presence-sensitive display (102), in response to the detecting and while the input unit is detected at the presence-sensitive display: determining, by the computing device, a candidate word for the identified gesture based at least in part on the at least two keys (104), and outputting the candidate word for display at a first location of the presence-sensitive display (106), and in response to determining that the input unit is no longer detected at the presence-sensitive display, outputting the displayed candidate word for display at a second location of the presence-sensitive display (108).

The example process of FIG. 6 may be executed by a one or more computing devices, including, e.g., example computing device 2 of FIGS. 1 and 5. In one example of the process of FIG. 6, UI device 4 of computing device 2 is configured to output a graphical keyboard including a number of keys associated with various symbols. Some of the keys of the graphical keyboard output by UI device 4 can represent letters by which a user may enter text at UI device 4. UI module 6 of computing device 2 can identify a gesture from a user to select at least two of the keys of the graphical keyboard based at least in part on UI device 4 detecting an input unit, e.g. the tip of the user's finger at a number of locations of a presence-sensitive display that forms part of UI device 4. In response to detecting the input unit at the locations of the display and while the input unit is still detected by UI device 4 at the presence-sensitive display, text prediction module 10 can determining a candidate word for the identified gesture based at least in part on the at least two keys and communicate the word or data representing the word to UI module 6, which may then control UI device 4 to output the candidate word for display at a first location of the presence-sensitive display. In response to determining that the input unit is no longer detected at the presence-sensitive display, UI device 4 can output the displayed candidate word for display at a second location of the presence-sensitive display.

In one example, the first location at which UI module 6 outputs the candidate word for display can include a location of the presence-sensitive display that is based at least in part on a detected location of the input unit that performed the identified gesture. For example, the first location of the presence-sensitive display can be a threshold distance from the detected location of the input unit that performed the identified gesture. In one example, the first location includes a number of different locations of the presence-sensitive display based at least in part on the detection of the input unit at a number of locations of the presence-sensitive display.

In one example, text prediction module 10 can determine more than one candidate word for the identified gesture based at least in part on the at least two keys of the graphical keyboard. Text prediction module 10 can communicate the additional candidate words or data representing the words to UI module 6, which may then control UI device 4 to output the candidate words for display at one or more locations of the presence-sensitive display that are near or far from the first location at which the first candidate word is output for display. In such a case, UI module 6 can identify another gesture to select one of the additional candidate words over the first candidate word. In response to identifying the other gesture to select the one of the other candidate words over the first candidate word and determining that the input unit is no longer detected at the presence-sensitive display, UI module 6 can control UI device 4 to output the second candidate word for display at a location of the presence-sensitive display, e.g., at text entry area 16.

In some examples in addition to outputting candidate words for display, computing device 2 may communicate the words to a user by other means. For example, in response to detecting the presence of an input unit by UI device 4 and while the input unit is detected at a presence-sensitive display of UI device 4, a speaker included in output devices 46 of computing device 2 may audibly output the candidate word(s) determined by text prediction module 10 based on a partial gesture identified by UI module 6.

Figure 7:
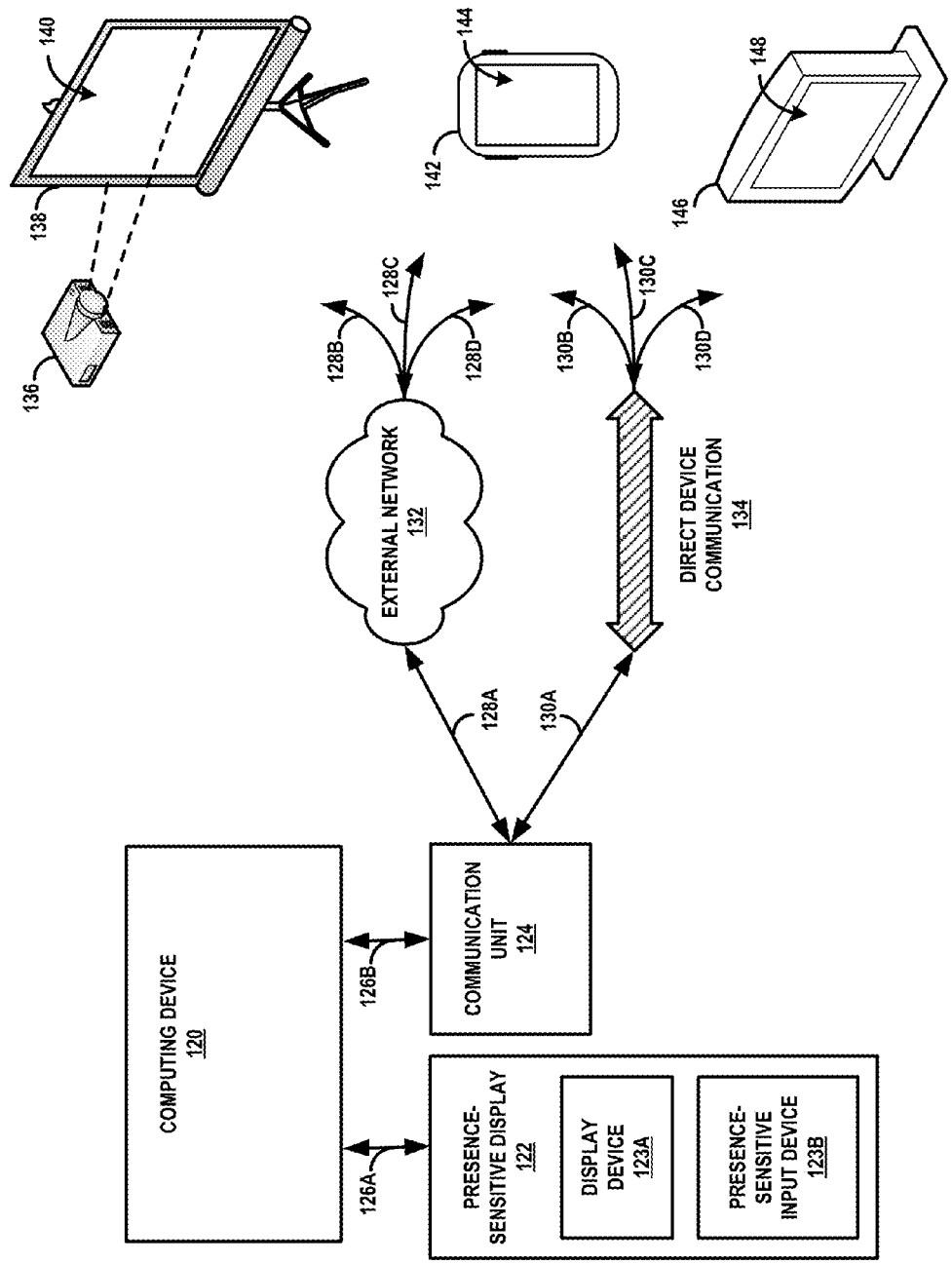
FIG. 7 is a block diagram illustrating an example computing device that may be configured to output a partial gesture graphical keyboard for display at a presence-sensitive display.

FIG. 7 is a block diagram illustrating an example computing device that outputs graphical content for display at a remote device, in accordance with one or more techniques of the present disclosure. Graphical content, generally, may include any visual information that may be output for display, such as text, images, a group of moving images, etc. The example shown in FIG. 7 includes a computing device 120, presence-sensitive display 122, communication unit 124, projector 136, projector screen 138, tablet device 142, and visual display device 146.

Although shown for purposes of example in FIGS. 1 and 5 as a stand-alone computing device 2, a computing-device may, generally, be any component or system that includes a processor or other suitable computing environment for executing software instructions and, for example, need not include a presence-sensitive display. As shown in the example of FIG. 7, computing device 120 may be a processor that includes functionality as described with respect to processor 40 in FIG. 5. In the example of FIG. 7, computing device 120 may be operatively coupled to presence-sensitive display 122 by a communication channel 126A, which may be a system bus or other suitable connection. Computing device 120 may also be operatively coupled to communication unit 124, further described below, by a communication channel 126B, which may also be a system bus or other suitable connection. Although shown separately as an example in FIG. 7, computing device 120 may be operatively coupled to presence-sensitive display 122 and communication unit 124 by any number of one or more communication channels.

Presence-sensitive display 122, may include display device 123A and presence-sensitive input device 123B. Display device 123A may, for example, receive data from computing device 120 and display the graphical content. In some examples, presence-sensitive input device 123B may determine one or more user inputs (e.g., continuous gestures, multi-touch gestures, single-touch gestures, etc.) at presence-sensitive display 122 using capacitive, inductive, and/or optical recognition techniques and send indications of such user input to computing device 120 using communication channel 126A. In some examples, presence-sensitive input device 123B may be physically positioned on top of display device 123A such that, when a user positions an input unit over a graphical element displayed by display device 123A, the location at which presence-sensitive input device 123B corresponds to the location of display device 123A at which the graphical element is displayed.

As shown in FIG. 7, communication unit 124 may include functionality of communication unit 44 as described in FIG. 5. Examples of communication unit 124 may include a network interface card, an Ethernet card, an optical transceiver, a radio frequency transceiver, or any other type of device that can send and receive information. Other examples of such communication units may include Bluetooth, 3G, and WiFi radios, Universal Serial Bus (USB) interfaces, etc. Computing device 120 may also include and/or be operatively coupled with one or more other devices, e.g., input devices, output devices, memory, storage devices, etc. that are not shown in FIG. 7 for purposes of brevity and illustration.

FIG. 7 also illustrates a projector 136 and projector screen 138. Other such examples of projection devices may include electronic whiteboards, holographic display devices, and any other suitable devices for displaying graphical content. Projector 136 and projector screen 138 may include one or more communication units that enable the respective devices to communicate with computing device 120. In some examples, the one or more communication units may enable communication between projector 136 and projector screen 138. Projector 136 may receive data from computing device 120 that includes graphical content. Projector 136, in response to receiving the data, may project the graphical content onto projector screen 138. In some examples, projector 136 may determine one or more user inputs (e.g., continuous gestures, multi-touch gestures, single-touch gestures, etc.) at projector screen using optical recognition or other suitable techniques and send indications of such user input using one or more communication units to computing device 120.

Projector screen 138, in some examples, may include a presence-sensitive display 140. Presence-sensitive display 140 may include a subset of functionality or all of the functionality of UI device 4 as described in this disclosure. In some examples, presence-sensitive display 140 may include additional functionality. Projector screen 138 (e.g., an electronic whiteboard), may receive data from computing device 120 and display the graphical content. In some examples, presence-sensitive display 140 may determine one or more user inputs (e.g., continuous gestures, multi-touch gestures, single-touch gestures, etc.) at projector screen 138 using capacitive, inductive, and/or optical recognition techniques and send indications of such user input using one or more communication units to computing device 120.

FIG. 7 also illustrates tablet device 142 and visual display device 146. Tablet device 142 and visual display device 146 may each include computing and connectivity capabilities. Examples of tablet device 142 may include e-reader devices, convertible notebook devices, hybrid slate devices, etc. Examples of visual display device 146 may include televisions, computer monitors, etc. As shown in FIG. 7, tablet device 142 may include a presence-sensitive display 144. Visual display device 146 may include a presence-sensitive display 148. Presence-sensitive displays 144, 148 may include a subset of functionality or all of the functionality of UI device 4 as described in this disclosure. In some examples, presence-sensitive displays 144, 148 may include additional functionality. In any case, presence-sensitive display 144, for example, may receive data from computing device 120 and display the graphical content. In some examples, presence-sensitive display 144 may determine one or more user inputs (e.g., continuous gestures, multi-touch gestures, single-touch gestures, etc.) at projector screen using capacitive, inductive, and/or optical recognition techniques and send indications of such user input using one or more communication units to computing device 120.

As described above, in some examples, computing device 120 may output graphical content for display at presence-sensitive display 122 that is coupled to computing device 120 by a system bus or other suitable communication channel. Computing device 120 may also output graphical content for display at one or more remote devices, such as projector 130, projector screen 138, tablet device 142, and visual display device 146. For instance, computing device 120 may execute one or more instructions to generate and/or modify graphical content in accordance with techniques of the present disclosure. Computing device 120 may output the data that includes the graphical content to a communication unit of computing device 120, such as communication unit 124. Communication unit 124 may send the data to one or more of the remote devices, such as projector 136, projector screen 138, tablet device 142, and/or visual display device 146. In this way, computing device 120 may output the graphical content for display at one or more of the remote devices. In some examples, one or more of the remote devices may output the graphical content at a presence-sensitive display that is included in and/or operatively coupled to the respective remote devices.

In some examples, computing device 120 may not output graphical content at presence-sensitive display 122 that is operatively coupled to computing device 120. In other examples, computing device 120 may output graphical content for display at both a presence-sensitive display 122 that is coupled to computing device 120 by communication channel 126A, and at one or more remote devices. In such examples, the graphical content may be displayed substantially contemporaneously at each respective device. For instance, some delay may be introduced by the communication latency to send the data that includes the graphical content to the remote device. In some examples, graphical content generated by computing device 120 and output for display at presence-sensitive display 122 may be different than graphical content display output for display at one or more remote devices.

Computing device 120 may send and receive data using any suitable communication techniques. For example, computing device 120 may be operatively coupled to external network 132 using network link 128A. Each of the remote devices illustrated in FIG. 7 may be operatively coupled to network external network 132 by one of respective network links 128B, 128C, and 128D. External network 132 may include network hubs, network switches, network routers, etc., that are operatively inter-coupled thereby providing for the exchange of information between computing device 120 and the remote devices illustrated in FIG. 7. In some examples, network links 128A-128D may be Ethernet, ATM or other network connections. Such connections may be wireless and/or wired connections.

In some examples, computing device 120 may be operatively coupled to one or more of the remote devices included in FIG. 7 using direct device communication 134. Direct device communication 134 may include communications through which computing device 120 sends and receives data directly with a remote device, using wired or wireless communication. That is, in some examples of direct device communication 134, data sent by computing device 120 may not be forwarded by one or more additional devices before being received at the remote device, and vice-versa. Examples of direct device communication 134 may include Bluetooth, Near-Field Communication, Universal Serial Bus, WiFi, infrared, etc. One or more of the remote devices illustrated in FIG. 7 may be operatively coupled with computing device 120 by communication links 130A-130D. In some examples, communication links 130A-130D may be connections using Bluetooth, Near-Field Communication, Universal Serial Bus, infrared, etc. Such connections may be wireless and/or wired connections.

In accordance with techniques of the disclosure, computing device 120 may be operatively coupled to visual display device 146 using external network 132. Computing device 120 may output a graphical keyboard for display at presence-sensitive display 148. For instance, computing device 120 may send data that includes a representation of the graphical keyboard to communication unit 124. Communication unit 124 may send the data that includes the representation of the graphical keyboard to visual display device 146 using external network 132. Visual display device 146, in response to receiving the data using external network 132, may cause presence-sensitive display 148 to output the graphical keyboard. In response to a user performing a gesture at presence-sensitive display 148 to select at least two of the plurality of keys of the graphical keyboard based at least in part on detecting an input unit at a plurality of locations of presence-sensitive display 148, visual display device 146 may send an indication of the gesture to computing device 100 using external network 114. Communication unit 124 of may receive the indication of the gesture, and send the indication to computing device 120.

Computing device 120 may, in response to the detecting and while the input unit is detected at presence-sensitive display 148, determine a candidate word for the gesture based at least in part on the at least two keys. In some examples, computing device 120 may output the candidate word for display at a first location of presence-sensitive display 148. For instance, computing device 120 may send data to communication unit 124, which in turn sends the data to visual display device 146, the data causing presence-sensitive display 148 to display the candidate word at the first location of presence-sensitive display 148.

The user may subsequently remove her finger from detection at presence-sensitive display 148. In response to determining the finger is no longer detected at presence-sensitive display 148, visual display device 146 may send an indication that the finger (e.g., input unit) is no longer detected at presence-sensitive display 148 to computing device 120 via external network 132. Communication unit 124 may receive the indication which is sent to computing device 120. Computing device 120 may, in response to determining that the input unit is no longer detected at presence-sensitive display, select a candidate word. The candidate word may be the word associated with a highest probability based on one or more selected characters. Computing device 120 may send data that represents the candidate word to visual display device 146 via external network 132 as described above. In response to receiving the data, visual display device 146, may output the candidate word for display at a second location of presence-sensitive display 148.

The techniques described in this disclosure may be implemented, at least in part, in hardware, software, firmware, or any combination thereof. For example, various aspects of the described techniques may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit including hardware may also perform one or more of the techniques of this disclosure.

Such hardware, software, and firmware may be implemented within the same device or within separate devices to support the various techniques described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware, firmware, or software components. Rather, functionality associated with one or more modules or units may be performed by separate hardware, firmware, or software components, or integrated within common or separate hardware, firmware, or software components.

The techniques described in this disclosure may also be embodied or encoded in an article of manufacture including a computer-readable storage medium encoded with instructions. Instructions embedded or encoded in an article of manufacture including a computer-readable storage medium encoded, may cause one or more programmable processors, or other processors, to implement one or more of the techniques described herein, such as when instructions included or encoded in the computer-readable storage medium are executed by the one or more processors. Computer readable storage media may include random access memory (RAM), read only memory (ROM), programmable read only memory (PROM), erasable programmable read only memory (EPROM), electronically erasable programmable read only memory (EEPROM), flash memory, a hard disk, a compact disc ROM (CD-ROM), a floppy disk, a cassette, magnetic media, optical media, or other computer readable media. In some examples, an article of manufacture may include one or more computer-readable storage media.

In some examples, a computer-readable storage medium may include a non-transitory medium. The term "non-transitory" may indicate that the storage medium is not embodied in a carrier wave or a propagated signal. In certain examples, a non-transitory storage medium may store data that can, over time, change (e.g., in RAM or cache).

Various examples have been described. These and other examples are within the scope of the following claims.

The invention claimed is:

1. A method comprising:
outputting, by a computing device and for display at a display device operatively coupled to the computing device, a graphical keyboard comprising a plurality of keys;
receiving, by the computing device, an indication of a gesture entered by an input unit detected at a plurality of locations of a presence-sensitive input device to select fewer than all of a group of the plurality of keys that corresponds to a candidate word;
responsive to determining, based on the at least one input unit being detected at a particular location from the plurality of locations, that the gesture has not yet terminated:
  determining, based on the gesture, that the candidate word is a most likely candidate word of a plurality of candidate words associated with respective keys of the plurality of keys;
  responsive to determining that a speed of the gesture is below a threshold, outputting, by the computing device, for display at a first location of the display device that is associated with the particular location from the plurality of locations of the presence-sensitive input device, the candidate word; and
responsive to determining, based on the at least one input unit no longer being detected at the presence-sensitive input device, that the gesture has terminated prior to selecting all of the group of the plurality of keys that corresponds to the candidate word, outputting, by the computing device, for display at a second location of the display device that corresponds to a text entry area, the candidate word.

2. The method of claim 1, wherein, when output for display at the first location of the display device the candidate word moves with the at least one input unit as the gesture is detected by the presence-sensitive input device.

3. The method of claim 1, further comprising:
determining, by the computing device, the gesture while the at least one input unit is within a threshold distance of the presence-sensitive input device, and
responsive to determining that the at least one input unit is no longer within the threshold distance of the presence-sensitive input device, determining, by the computing device, the gesture has terminated.

4. A computing device comprising:
at least one processor;
a display device operatively coupled to the computing device;
a presence-sensitive input device operatively coupled to the computing device; and
at least one module operable by the at least one processor to:
output, for display at the display device, a graphical keyboard comprising a plurality of keys;
receive an indication of a gesture entered by an input unit detected at a plurality of locations of the presence-sensitive input device to select fewer than all of a group of the plurality of keys that corresponds to a candidate word;
responsive to determining, based on the at least one input unit being detected at a particular location from the plurality of locations, that the gesture has not yet terminated:
determine, based on the gesture, that the candidate word is a most likely candidate word of a plurality of candidate words associated with respective keys of the plurality of keys;
responsive to determining that a speed of the gesture is below a threshold, output, for display at a first location of the display device that is associated with the particular location from the plurality of locations of the presence-sensitive input device, the candidate word; and
responsive to determining, based on the at least one input unit no longer being detected at the presence-sensitive input device, that the gesture has terminated prior to selecting all of the group of the plurality of keys that corresponds to the candidate word, output, for display at a second location of the display device that corresponds to a text entry area, the candidate word.

5. The computing device of claim 4, wherein when output for display at the first location of the display device the candidate word moves with the at least one input unit as the gesture is detected by the presence-sensitive input device.

6. The computing device of claim 4, wherein the at least one module operable is further operable by the at least one processor to:
determine the gesture while the at least one input unit is within a threshold distance of the presence-sensitive input device, and
responsive to determining that the at least one input unit is no longer within the threshold distance of the presence-sensitive input device, determine the gesture has terminated.

7. A non-transitory computer-readable storage medium encoded with instructions that, when executed, cause at least one processor of a computing device to:
output, for display at a display device operatively coupled to the computing device, a graphical keyboard comprising a plurality of keys;
receive an indication of a gesture entered by an input unit detected at a plurality of locations of a presence-sensitive input device to select fewer than all of a group of the plurality of keys that corresponds to a candidate word;
responsive to determining, based on the at least one input unit being detected at a particular location from the plurality of locations, that the gesture has not yet terminated:
determine, based on the gesture, that the candidate word is a most likely candidate word of a plurality of candidate words associated with respective keys of the plurality of keys;
responsive to determining that a speed of the gesture is below a threshold, output, for display at a first location of the display device that is associated with the particular location from the plurality of locations of the presence-sensitive input device, the candidate word; and
responsive to determining, based on the at least one input unit no longer being detected at the presence-sensitive input device, that the gesture has terminated prior to selecting all of the group of the plurality of keys that corresponds to the candidate word, output, for display at a second location of the display device that corresponds to a text entry area, the candidate word.

8. The non-transitory computer-readable storage medium of claim 7, wherein, when output for display at the first location of the display device the candidate word moves with the at least one input unit as the gesture is detected by the presence-sensitive input device.

9. The method of claim 1, further comprising:
further responsive to determining that the gesture has not yet terminated and responsive to determining that the speed of the gesture is above the threshold, refraining, by the computing device, from outputting the candidate word for display at the first location.

10. The computing device of claim 4, wherein the at least one module operable is further operable by the at least one processor to:
further responsive to determining that the gesture has not yet terminated and responsive to determining that the speed of the gesture is above the threshold, refrain from outputting the candidate word for display at the first location.

11. The non-transitory computer-readable storage medium of claim 7, further encoded with instructions that, when executed, cause the at least one processor of the computing device to further responsive to determining that the gesture has not yet terminated and responsive to determining that the speed of the gesture is above the threshold, refrain from outputting the candidate word for display at the first location.

12. The method of claim 1, wherein the particular location and the first location of the display device corresponds to the particular location from the plurality of locations of the presence-sensitive input device.

13. The computing device of claim 4, wherein the particular location and the first location of the display device corresponds to the particular location from the plurality of locations of the presence-sensitive input device.

14. The non-transitory computer-readable storage medium of claim 7, wherein the particular location and the first location of the display device corresponds to the particular location from the plurality of locations of the presence-sensitive input device.

* * * * *